US006532421B2

(12) United States Patent
Miwa

(10) Patent No.: US 6,532,421 B2
(45) Date of Patent: Mar. 11, 2003

(54) METHOD FOR ESTIMATING A LIFE OF APPARATUS UNDER NARROW-BAND RANDOM STRESS VARIATION

(75) Inventor: Masataka Miwa, Nagoya (JP)

(73) Assignee: Toho Gas Co., LTD, Nagoya (JP)

( * ) Notice: Subject to any disclaimer, the term of this patent is extended or adjusted under 35 U.S.C. 154(b) by 0 days.

(21) Appl. No.: 09/727,703

(22) Filed: Dec. 4, 2000

(65) Prior Publication Data

US 2001/0034581 A1 Oct. 25, 2001

(30) Foreign Application Priority Data

Apr. 7, 2000 (JP) ....................................... 2000-106474
May 12, 2000 (JP) ....................................... 2000-140419

(51) Int. Cl.$^{7}$ .................................................. G01B 3/44

(52) U.S. Cl. ........................... 702/34; 702/84; 702/101; 73/866.4; 73/804; 73/799; 73/760; 374/57; 700/79; 700/80

(58) Field of Search ................................ 73/866.4, 804, 73/799, 760; 374/57; 702/34, 84, 181; 760/79, 80

(56) References Cited

U.S. PATENT DOCUMENTS

| | | | | | |
|---|---|---|---|---|---|
| 4,987,367 | A | * | 1/1991 | Ishikawa et al. | 324/227 |
| 5,050,108 | A | * | 9/1991 | Clark et al. | 702/34 |
| 5,455,777 | A | * | 10/1995 | Fujiyama et al. | 702/34 |
| 6,049,741 | A | * | 4/2000 | Kawamura | 700/80 |
| 6,226,597 | B1 | * | 5/2001 | Eastman et al. | 702/34 |
| 6,301,970 | B1 | * | 10/2001 | Biggs et al. | 73/804 |

* cited by examiner

*Primary Examiner*—John Barlow
*Assistant Examiner*—Stephen J. Cherry
(74) *Attorney, Agent, or Firm*—Oliff & Berridge, PLC

(57) ABSTRACT

A method for estimating the life of an apparatus under a random stress amplitude variation, involving determining a probability density function of a cumulated damage quantity and estimating the life of the apparatus on the basis of the probability density function, characterized by: approximating a damage coefficient indicative of a damage quantity per unit by a linear expression when the random stress amplitude variation is in a narrow band; and representing the random stress amplitude variation $\sigma(t)$(instantaneous) in terms of the sum of a time averaged value $\sigma(t)$(mean) and a stochastic variation $\sigma'$.

5 Claims, 10 Drawing Sheets

FIG. 1

| | |
|---|---|
| $f(p(t))$ | Function of a cumulated damage quantity |
| $g(p, t \mid p_b, t_b)$ | Conditional probability density function of a cumulated damage quantity |
| $M$ | Distribution dilatation ratio |
| $N_i$ | Number of times of rupture repetition corresponding to the $i^{th}$ load stress |
| $n$ | Number of times of repetition |
| $p(t)$ | Normalized cumulated damage quantity |
| $p_b$ | Initial cumulated damage quantity |
| $Q_\sigma$ | Load stress variation strength |
| $T$ | Rupture time or residual life |
| $s, t$ | Time |
| $t_b$ | Experiment start time |
| $\Delta t$ | Repetition time interval of load stress |
| $dW_\sigma(t)$ | Increment of Wiener process |
| $\delta(t)$ | Dirac's delta function |
| $\phi(\sigma)$ | Damage coefficient |
| $\sigma$ | Load stress amplitude |
| $\hat{\sigma}'$ | Modified stress amplitude variation; provided $\sigma'$(modified) is used in the spec. |
| $\xi(t)$ | Noise |
| $\tilde{\sigma}$ | Instantaneous value of a fluctuating stress; provided $\sigma$(instantaneous) is used in the spec. |
| $\bar{\sigma}$ | Mean value of a fluctuating stress; provided $\sigma$(mean) is used in the spec. |
| $\sigma'$ | Stochastic variation of a fluctuating stress |
| $\bar{\phi}$ | $\phi(\bar{\sigma})$; provided $\phi$(mean) is used in the spec. |

S-N DIAGRAM OF AIRCRAFT ALUMINUM ALLOY 2024-T4

COMPARISON WITH RESULTS OF RANDOM LOAD EXPERIMENT

FIG. 8

| | |
|---|---|
| $g(p, t \mid p_b, t_b)$ | Conditional probability density function of a cumulated damage quantity |
| $n$ | Number of times of repetition |
| $p(t)$ | Normalized cumulated damage quantity |
| $p_b$ | Initial cumulated damage quantity |
| $Q_\sigma$ | Load stress variation strength |
| $Q_\theta$ | Temperature variation strength |
| $T$ | Rupture time or residual life |
| $t$ | Time |
| $t_b$ | Experiment start time |
| $\Delta t$ | Repetition time interval of load stress |
| $dW_\sigma(t)$ | Increment of Wiener process in stress |
| $dW_\theta(t)$ | Increment of Wiener process in temperature |
| $\delta(t)$ | Dirac's delta function |
| $\phi(\sigma, \theta)$ | Damage coefficient |
| $\sigma$ | Load stress |
| $\theta$ | Temperature |
| $\xi(t)$ | Noise |
| $\tilde{\sigma}$ | Instantaneous value of a fluctuating stress; provided $\sigma$(instantaneous) is used in the spec. |
| $\bar{\sigma}$ | Mean value of a fluctuating stress; provided $\sigma$(mean) is used in the spec. |
| $\sigma'$ | Probability variation of a fluctuating stress |
| $\tilde{\theta}$ | Instantaneous value of a fluctuating temperature; provided $\sigma$(instantaneous) is used in the spec. |
| $\bar{\theta}$ | Mean value of a fluctuating temperature; provided $\theta$(mean) is used in the spec. |
| $\theta''$ | Stochastic variation of a fluctuating temperature |
| $\bar{\phi}$ | $\phi(\bar{\sigma}, \bar{\theta})$; provided $\phi$(mean) is used in the spec. |

METHOD FOR ESTIMATING A LIFE OF APPARATUS UNDER NARROW-BAND RANDOM STRESS VARIATION

BACKGROUND OF THE INVENTION

1. Field of Invention

The invention relates to a method for estimating the life of an industrial apparatus using gas, or the like. More particularly, the invention is concerned with a method of estimating the life of a gas-using apparatus or the like by treating a damage cumulating process of each component of the apparatus as a stochastic process.

2. Description of Related Art

For gas apparatus materials for high temperatures, including industrial furnaces, there is no common standard as to when and how inspection is to be conducted, and measures are taken according to the purposes for which the apparatuses are used. In many cases, gas apparatuses are used in environments which are severe thermally and chemically, such as environments exposed to high temperatures or apt to undergo corrosion. Even in the case of apparatuses having the same specifications, loads imposed thereon differ depending on users and there occur relatively large variations in the accumulation speed of apparatus damage or in the apparatus life. Monitoring the state of apparatus components in detail may be a way to solve this problem, but there arise such problems as the sensor operation environment and the place of installation being limited and the cost for the monitor causing a cost increase. Thus, at present, there are few techniques for practical application.

Particularly, in a gas apparatus under working conditions, starting and stopping of operation are repeated in accordance with an operation schedule of the apparatus and there occur variations in the amount of heat transferred to an article to be heated, for example, and a narrow-band random stress amplitude variation involving a relatively random variation in peak values of a load stress, such as a thermal stress, is applied to the material of the apparatus. The "narrow band" means that variations in the peak value of a load stress, such as a thermal stress, are in a relatively narrow range.

Moreover, in a high-temperature gas apparatus it is presumed that there will occur damage caused by creep deformation. Creep deformation indicates a deformation caused by an increase of strain with the lapse of time upon exertion of a certain magnitude of stress on a certain material under a half, or higher, temperature of a melting point at absolute temperature.

For this reason, in the development of a high-temperature gas apparatus, it is considered necessary to develop a damage estimating technique capable of estimating damage accumulation caused by load variations under working conditions.

One such known damage estimating technique is a technique in which a material damage process is treated as a stochastic process. In connection with this technique, the following two methods are known.

In the first method, the development of a crack in a material is treated as a stochastic process. Further, in connection with causes of irregularity in a damage development model, classification can be made into studies in which a crack development resistance is adopted and studies in which irregularity of load stresses is adopted.

In these studies, basically a random term which is a source of irregularity is introduced in part of Paris-Erdogan's law, which is a deterministic equation representing crack development, independently of the cause of irregularity, to afford a stochastic differential equation, thereby building a model of damage development.

In the second method, which is based on the concept of continuum damage dynamics, the influence of a fluctuating load and a time and spatial variation in a microscopic material characteristic caused by the occurrence of a microcrack, or the like, upon a change in a macroscopic characteristic of the material strength is formulated and the development of damage is described. This method is one of the practical methods because it handles a damage parameter which can be defined from a macroscopic characteristic.

As a typical example of the above method there is known a study made by Silberschmidt. In this study, a non-linear Langevin equation (expression 1) is given for damage accumulation of a randomly fluctuating minor-axis tensile load (I mode):

$$\frac{dp}{dt} = f(p) + g(p)L(t), \tag{1}$$

where f(p) is the right side of a deterministic equation for mode I damage:

$$f(p)=Ap^3+Bp^2+Cp-D\sigma, \tag{2}$$

and L(t) is a stochastic term, A, B, C, and D are empirical values, and g(p) is modeled on the assumption that the strength of the stochastic term is proportional to the accumulation degree of damage at a certain time. In the Silberschmidt's analysis, the non-linear Langevin equation is solved numerically to indicate a qualitative change of PDF (probability density function) against a change in stress variation strength, and an empirical fact for the shortening of the material life, which occurs in the presence of stress variation, is shown by calculation.

However, the conventional methods for estimating the life of a gas apparatus involve the following problems.

In the above first method, because the calculation is made on the basis of the development of crack, it is necessary to determine which portion of the apparatus is apt to crack. Generally, a crack-prone place is determined on the basis of a portion of the apparatus where stress concentration is apt to occur. But the components of the gas apparatus operating in a production site are complicated in shape, so it is in many cases difficult to predict a portion of the apparatus where a crack is apt to occur. Also due to the complicated shapes of the gas apparatus components, the process up to rupture may differ greatly depending on the crack-formed places.

Upon occurrence of a crack it is necessary to check the state of the crack in detail, which, however, is difficult because of complicated shapes of gas apparatus components.

Therefore, in estimating with a high accuracy the life of a gas apparatus working in a production site, it is in many cases difficult to adopt a method which involves making a direct calculation for a crack while regarding the crack as being clear in its size and position, thereby introducing a random term as a source of irregularity into part of the Paris-Erdogan's law which is a deterministic equation representing basically the development of the crack, to afford a stochastic differential equation, and thereby building a model of damage development.

In connection with the above second method, the method of estimating the creep life of a gas apparatus is advantageous in that it is not necessary to take the development of a crack into account. But no reference is made therein to temperature variation and it is impossible to estimate the influence of temperature variation. When there is a temperature variation, therefore, it is impossible to accurately estimate the creep life. In gas apparatuses, however, not only stress but also temperature varies in many cases, in which case the method in question is not applicable.

Thus, it is difficult for the second method to accurately estimate the life of a gas apparatus.

SUMMARY OF THE INVENTION

The invention has been accomplished to solve the above-mentioned problems and it is an object of the invention to provide a method wherein, when treating a damage process of material as a stochastic process, the life of an apparatus under a narrow-band random stress variation is estimated without making a direct calculation while regarding a crack as being clear in its size and position.

It is also an object of the invention to provide a method wherein, when treating a damage process of material as a stochastic process, the influence of a fluctuating load and a time and spatial variation in a microscopic material characteristic caused by the occurrence of a microcrack or the like upon a change in a macroscopic characteristic of the material strength is formulated. The development of damage is then described to estimate a creep life of the apparatus concerned, the creep life estimation being done in the case where both narrow-band random stress variation and narrow-band random temperature variation are applied to the apparatus.

To achieve the above-mentioned objects of the invention, there is provided a method for estimating a life of an apparatus under a random stress amplitude variation, involving determining a probability density function of a cumulated damage quantity and estimating the life of the apparatus on the basis of the probability density function, characterized by approximating a damage coefficient indicative of a damage quantity per unit by a linear expression when the random stress amplitude variation is in a narrow band; and representing the random stress amplitude variation $\sigma(t)$(instantaneous) in terms of the sum of a time averaged value $\sigma(t)$(mean) and a stochastic variation $\sigma'$.

In the apparatus life estimating method under a narrow-band random stress variation, which has the above-mentioned characteristics, Miner's law is used. By Miner's law is meant a method wherein an accumulated damage quantity is calculated by accumulating a life which is determined by both stress and repetitive number with use of an S-N curve, and a residual life is estimated. Thus, it is not necessary to use Paris-Erdogan's law, which is a deterministic equation representing the development of a crack, that is, no consideration is needed of the development of a crack. Further, by representing the random stress amplitude variation $\sigma(t)$(instantaneous) in terms of the sum of both time averaged value $\sigma(t)$(mean) and stochastic variation $\sigma'(t)$ and by approximating a damage coefficient by a linear expression which coefficient represents a damage quantity for one time, there is derived a Langevin equation of the accumulated damage quantity which represents Miner's law. The Langevin equation of the cumulated damage quantity which represents Miner's law indicates a stochastic differential equation with a stochastic process-containing function introduced into a dynamic equation which represents the development of damage shown by Miner's law in the case of the stress amplitude being constant. Consequently, Miner's law is extended in the case where the load stress amplitude varies randomly in a narrow band.

Thus, a model of the development of accumulated damage quantity can be shown by solving this Langevin equation and therefore a mean value or a deviation of damage accumulated in a material at a certain time can be obtained without directly handling a crack which is clear in its size and position.

The invention is also characterized by using as the above damage accumulation process a Langevin equation and a Fokker-Planck equation corresponding thereto.

That is, in estimating material damage and life, not only a mean value and a deviation of the damage accumulated in the material at a certain time, but also a probability density function and a probability distribution of damage play an important role. Generally, the probability density function of damage is arranged in terms of a normal distribution, a logarithmic normal distribution, or a Weibull distribution. But a distribution in the case of a randomly fluctuating stress amplitude is not clear at present. Therefore, a Fokker-Planck equation corresponding to the Langevin equation is derived. The Fokker-Planck equation indicates a partial differential equation of second order in a probability density function derived on the assumption that a moment of a cubic or higher order of the transition quantity can be ignored in a continuous Markov process. The Markov process indicates a process in which information at a future time $t_2$ relating to a stochastic variable is described completely by information at the present time $t_1$.

Accordingly, by solving the Fokker-Planck equation, a probability density function of a cumulated damage quantity at any time in the period from the start of the experiment up to rupture can be expressed in the form of a normal distribution.

Further, on the basis of the Fokker-Planck equation, it is possible to obtain a predictive expression of a residual life from an arbitrary cumulated damage quantity of a material which has already been damaged. Thus, even in the case of a randomly varying stress amplitude, it is possible to obtain a probability density function of damage and a predictive expression of a residual life.

In the creep life estimating method according to the invention, a damage coefficient based on Robinson's damage fraction rule is used to determine a probability density function of a cumulated damage quantity. According to the method using Robinson's damage fraction rule, an accumulated damage quantity is calculated by accumulating a life determined by a degree-of-damage curve which uses the Larson-Miller parameter plotted along the axis of abscissa and stress plotted along the axis of ordinate. The Larson-Miller parameter is an empirical function with stress being represented by both temperature and life in creep rupture. Thus, both stress and temperature can be taken into consideration in the estimation of life.

Moreover, by representing the random stress amplitude variation $\sigma(t)$(instantaneous) in terms of the sum of time averaged value $\sigma(t)$(mean) and stochastic variation $\sigma'(t)$, by representing the random temperature variation $\theta(t)$ (instantaneous) in terms of the sum of time averaged value $\theta(t)$(mean) and stochastic variation $\theta'(t)$, and further by approximating the damage coefficient which represents the damage quantity for one time by a linear expression, there is derived a Langevin equation of an accumulated damage quantity. The Langevin equation of an accumulated damage quantity means a stochastic differential equation with a function incorporated in a dynamic equation which represents a damage evolution shown by the Robinson's damage fraction rule in a constant temperature condition, the function containing a stochastic process based on stress variation and temperature variation. With the stochastic differential equation, the Robinson's damage fraction rule is extended in the case where both load stress and load temperature vary in a narrow band.

By solving the Langevin equation it is possible to show a development model of the accumulated damage quantity based on creep deformation in case of both load stress and load temperature varying randomly in a narrow band. That is, it is possible to accurately estimate the life of a gas apparatus in which both stress and temperature fluctuate.

The invention is further characterized by using, as the damage cumulation process, both a Langevin equation and a Fokker-Planck equation corresponding thereto.

That is, a Fokker-Planck equation corresponding to the Langevin equation is derived. The Fokker-Planck equation means a partial differential equation of second order in a probability density function which has been derived on the assumption that a moment of cubic or higher order of the transition quantity can be ignored in a continuous Markov process. The Markov process indicates a process wherein information at a future time $t_2$ relating to a stochastic variable is described completely by information at the present time $t_1$.

By solving the Fokker-Planck equation, a probability density function of a cumulated damage quantity at any time in the period from the start of the experiment up to rupture can be expressed in the form of a normal distribution.

Further, on the basis of the Fokker-Planck equation it is possible to obtain a predictive expression of a residual life from an arbitrary cumulated damage quantity of a material which has already been damaged. Thus, it is possible to obtain a probability density function of damage and a predictive expression of a residual life in the case where both stress and temperature vary randomly.

BRIEF DESCRIPTION OF THE DRAWINGS

The accompanying drawings, which are incorporated into and constitute a part of the specification, illustrate embodiments of the invention and, together with the description, serve to explain the objects, advantages and principles of the invention.

In the drawings:

FIG. 1 is a table which represents symbols of mathematical expressions used in an embodiment of the invention;

FIG. 8 is a table which represents symbols of mathematical expressions used in another embodiment of the invention;

DETAILED DESCRIPTION OF PREFERRED EMBODIMENTS

Figure 10:
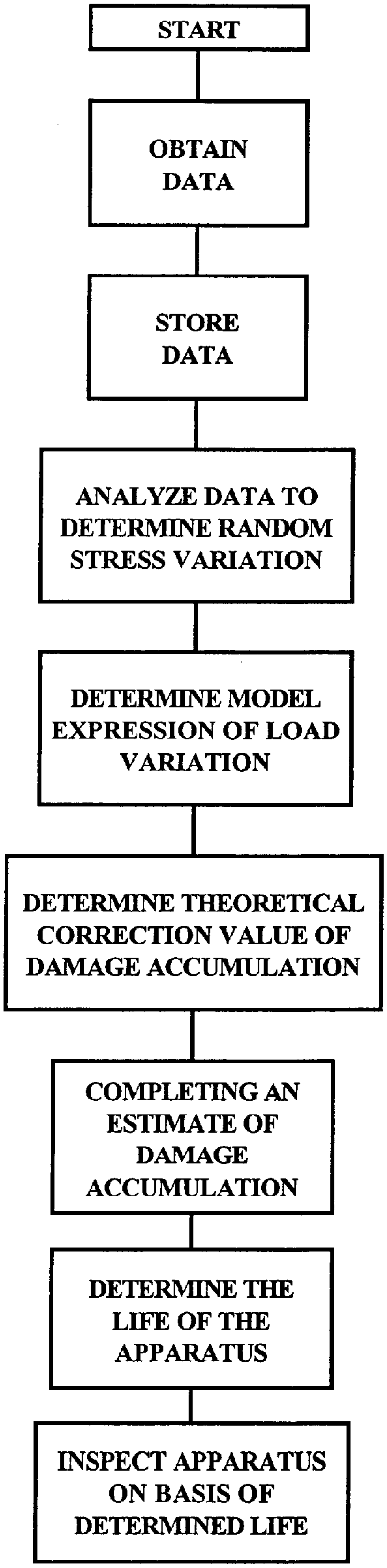
FIG. 10 is a flow diagram of the method.

With reference to the accompanying drawings and mathematical expressions, a detailed description will be given below of the first embodiment of the invention which embodies a method (shown in overview in FIG. 10) for estimating the life of an apparatus under a narrow-band random stress variation. Symbols of mathematical expressions used in the first embodiment are explained briefly in FIG. 1.

For the estimation of life under a fluctuating load, Miner's law, which is a linear damage rule based on an S-N curve under a constant amplitude load, is used in many cases. However, among the studies so far reported there are included those that do not conform to Miner's law. As causes there are mentioned a difference of degree-of-damage curves based on stress and the influence of an interference effect induced by stress variation. In this connection, for Miner's law to be valid as a statistical average, it is necessary that a transfer rule of degree-of-damage curves should be established and that a degree-of-damage curve should be independent of the order of damage degree and stress. It is here assumed that these two conditions are satisfied with respect to the material used in this analysis. The S-N curve used for estimating the degree of damage in this analysis is an S-N curve of a constant amplitude load.

First, a Langevin equation based on Miner's law is derived. Consider the case where a random stress amplitude $\sigma_i$ is loaded at every time interval $\Delta t$. The subscript i represents the number of times of repetition counted from the start of experiment. A cumulated damage quantity $P_n$ at a certain repetition number n from the start of experiment can be expressed as follows by totaling damage quantities cumulated in the material at various loads:

$$p_n = \sum_{i=1}^{n} \frac{1}{N_i}, \tag{3}$$

where $N_i$ is a rupture repetition number based on a certain stress amplitude $\sigma_i$ of the material. Now, a power rule is assumed as the S-N curve as follows:

$$N_i = \frac{\sigma_i^m}{C}, \tag{4}$$

where C and m are material constants. Assuming that the load repetition frequency is constant, the stress amplitude $\sigma_i$ is loaded at a certain time interval $\Delta t$, so the cumulated damage quantity can be expressed in terms of time as follows:

$$P_{n\Delta t} = \Delta t \sum_{i=1}^{n} \frac{1}{T_i}, \tag{5}$$

where $P_{n\Delta t}$ is a cumulated damage quantity after nΔt seconds and $T_i$ is a residual life $N_i\Delta t$ in a loaded state of a certain stress amplitude to an undamaged material. In the above expression, $1/T_i$ formally represents the quantity of damage which the material undergoes per unit time. Therefore, a function which represents a cumulated damage quantity per unit time in a repetition test conducted at a certain stress amplitude of is defined as follows:

$$\phi(\sigma)=1/T. \tag{6}$$

It is called a damage coefficient as a basic quantity which determines the damage accumulation process. The reason why the dimension of time is used is that not only fatigue induced by repetitive stress but also a high-temperature creep may proceed concurrently and cause damage to a high-temperature gas apparatus. Therefore the arrangement in terms of time is convenient to a synthetic judgment of damage. With use of the damage coefficient, a damage quantity dp of the material at a certain time interval dt can be expressed as follows:

$$dp=\phi(\sigma)dt. \tag{7}$$

Figure 2:
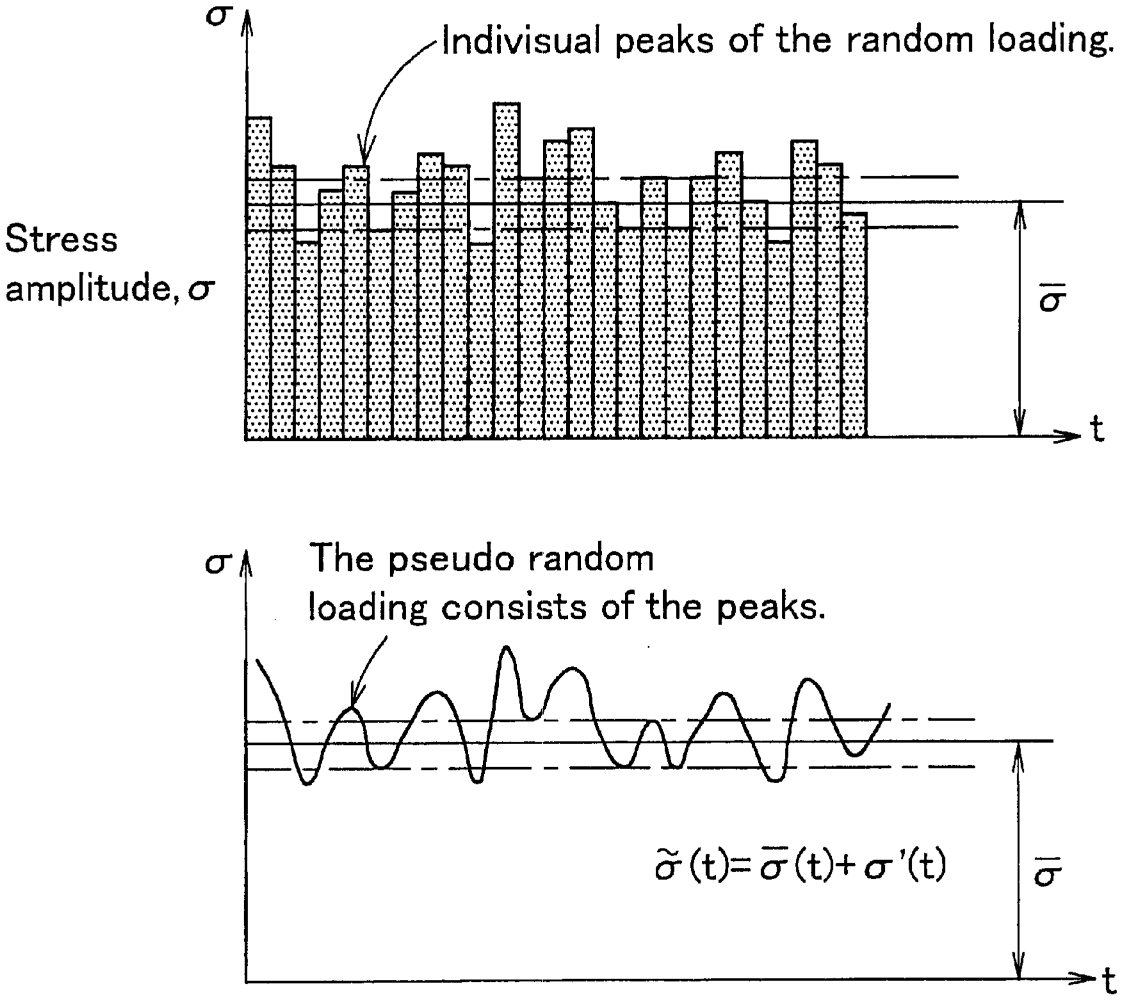
FIG. 2 is a conceptual diagram wherein a stress value at an arbitrary time is treated as a continuous function which represents changes with time of a stress peak value.

This is a dynamic expression which represents the development of damage with the lapse of time. In the scope of this model, the accumulated damage quantity is determined on the basis of the time elapsed from the start of experiment and a stress amplitude value, so in the following description the stress value at an arbitrary time is treated as a continuous function which represents changes with time of a stress peak value, the concept of which is shown in FIG. 2. In FIG. 2, time is plotted along the abscissa and peak values of stress amplitude are plotted along the ordinate.

Here is a check on the influence of a randomly varying stress amplitude in a dynamic equation of damage (expression 7). The stress amplitude which varies with time will be designated variation stress and an instantaneous value thereof is represented by σ(instantaneous). Assuming here a steady operation of an actually working machine and assuming that a fluctuating stress varies randomly at a time averaged value and thereabouts, the fluctuating stress is resolved into a time averaged value c(mean) and a stochastic variation σ' as follows:

$$\sigma(t)=\bar{\sigma}(t)+\sigma'(t), \tag{8}$$

where each term stands for a function of time. Out of the components in expression 8, a narrow-band variation is considered whose stochastic variation magnitude is sufficiently small in comparison with the mean value.

$$|\bar{\sigma}|>>|\sigma'|. \tag{9}$$

The stochastic variation of the second term on the right side of expression 8 is expressed as follows on the basis of both parameter $Q_\sigma$ which represents the intensity of variation and noise ξ(t) which is for expressing a stochastic variation:

$$\sigma'(t)=Q_\sigma\xi(t), \tag{10}$$

where ξ(t) is a mathematical expression of a rapidly changing, irregular function having a Gaussian distribution and its ensemble mean is <ξ)(t)>=0. Values ξ(t) and ξ(t') at a different time t≠t' are independent statistically and an autocorrelation function is expressed as <(ξ(t)ξ(t')>=δ(t−t') using Dirac's delta function δ(t).

It follows that σ' possesses the following properties:

(a) Ensemble mean of σ' is:

$$\langle\sigma'\rangle=0. \tag{11}$$

(b) Autocorrelation function of σ' is:

$$\langle\sigma'(t)\sigma(t')\rangle=Q^2_\sigma\delta(t-t'). \tag{12}$$

For estimating a cumulated damage quantity it is necessary to calculate φ(σ(instantaneous)) from an instantaneous fluctuating stress value σ(instantaneous). In practical use it is difficult to use the fluctuating stress directly. Therefore, a damage coefficient φ(σ(instantaneous)) is subjected to Taylor expansion at σ(mean) or thereabouts and a damage coefficient is estimated from both a mean value of the fluctuating stress and the strength of variation, as follows:

$$\phi(\tilde{\sigma}) = \phi(\overline{\sigma}) + \frac{\partial\phi(\overline{\sigma})}{\partial\sigma}(\tilde{\sigma}-\overline{\sigma}) + \frac{1}{2}\frac{\partial^2\phi(\overline{\sigma})}{\partial\sigma^2}(\tilde{\sigma}-\overline{\sigma})^2. \tag{13}$$

But under the narrow-band variation conditions (equation 9), orders of the terms in the expression 13 become:

$$O.(\phi)\, M\overline{\phi} \tag{14}$$

$$O.\left(\frac{\partial\overline{\phi}}{\partial\sigma}\sigma'\right)\overline{\phi}\cdot\frac{\sigma'}{\overline{\sigma}}$$

$$O.\left(\frac{1}{2}\frac{\partial^2\overline{\phi}}{\partial\sigma^2}\sigma'^2\right)\overline{\phi}\cdot\left(\frac{\sigma'}{\overline{\sigma}}\right)^2.$$

Thus, it is estimated that a high order term becomes very small. In expression 14, O. is the order of term. Therefore, infinitesimal terms of second order or more in the above expression are ignored and a damage coefficient is approximated by:

$$\phi(\tilde{\sigma}) = \phi(\overline{\sigma}) + \frac{\partial\phi(\overline{\sigma})}{\partial\sigma}\sigma'. \tag{15}$$

Substitution of this expression into expression 7 gives:

$$dp = \overline{\phi}dt + \frac{\partial\overline{\phi}}{\partial\sigma}Q_\sigma dW_\sigma. \tag{16}$$

This expression is a Langevin equation which represents Miner's law in a narrow-band random stress variation. In the above expression, φ(mean) represents φ(σ(mean)) and dWσ (t) represents an increment of the Wiener process with respect to σ'. Between dWσ and ξ there is a relation of dWσ=ξdt. Since the coefficients of the right side terms in the expression 16 are constants, it is possible to easily integrate the expression and the following evolution expression of p(t) is obtained:

$$p(t) = p_b + \int_{t_b}^{t}\overline{\phi}\,dt + \int_{t_b}^{t}\frac{\partial\overline{\phi}}{\partial\sigma}Q_\sigma\,dW_\sigma. \tag{17}$$

where $t_b$ is a test start time and $p_b$ is an initial damage quantity already found in the material at time $t_b$. This expression represents the results of innumerable fatigue tests starting from an initial state ($t_b$, $p_b$). But what is required in practical use is an expectation of damage accumulated at time t, so the evolution of the mean value is estimated by taking the ensemble mean <p> in the above expression, as follows:

$$\langle p\rangle = p_b + \bar{\phi} t. \tag{18}$$

In the model being considered, as is seen from expression 18, the evolution of the damage mean value coincides with the evolution of the damage which is calculated in accordance with Miner's law by a conventional method in the absence of any variation. Further, a square deviation of variation in the cumulated damage quantity become as follows:

$$\langle [p(t) - \langle p(t)\rangle]\rangle \langle [p(s) - \langle p(s)\rangle]\rangle = \left(\frac{\partial\bar{\phi}}{\partial\sigma}Q_\sigma\right)^2 \left\langle \int_{t_b}^{t} dW_\sigma \cdot \int_{t_b}^{s} dW_\sigma \right\rangle = \left(\frac{\partial\bar{\phi}}{\partial\sigma}Q_\sigma\right)^2 (t - t_b). \tag{19}$$

Consequently, the distribution of the damage at any time during the period from the time when the material begins to be damaged until when it is ruptured, comes to have an extent proportional to the gradient and variation strength of S-N curve, as well as a square root of elapsed time.

In the damage estimation and life estimation of a material, not only a mean value and a deviation of damage accumulated in the material at a certain time but also a probability density function and a probability distribution of damage play an important role. Generally, the probability density function of damage is arranged in terms of a normal distribution, a logarithmic normal distribution, or a Weibull distribution. But a distribution in the case of a randomly varying stress amplitude is not clear at present.

Therefore, a Fokker-Planck equation equivalent to the Langevin equation (expression 16) and a probability density function of damage, which is a solution of the equation, are derived in accordance with Gardiner's method and a probability density function shape of the amount of damage accumulated in the material at a certain time is calculated under the condition in which a random stress variation is imposed on the material.

Now, a function f(p(t)) of the random variable p(t) is introduced and a change of function $f$ at an infinitesimal time interval dt is expressed as follows:

$$df(p(t)) = f(p(t) + dp(t)) - f(p(t)) = \frac{\partial f}{\partial p}dp + \frac{1}{2}\frac{\partial^2 f}{\partial p^2}[dp]^2 + \ldots\ . \tag{20}$$

Expansion is made up to the second order power of dp for taking into account a contribution proportional to the infinitesimal time interval dt of a high order differential. Further, substitution of the expression 15 and arrangement give:

$$df(p(t)) = \left\{\bar{\phi}\frac{\partial f}{\partial p} + \frac{1}{2}\left(\frac{\partial\bar{\phi}}{\partial\sigma}Q_\sigma\right)^2 \frac{\partial^2 f}{\partial p^2}\right\}dt + \frac{\partial\bar{\phi}}{\partial\sigma}\frac{\partial f}{\partial p}Q_\sigma dW_\sigma. \tag{21}$$

Here there were used $(dt)^2=0$, $dtdW\sigma=0$, and $(dW\sigma)^2=dt$. An ensemble mean of both sides in this expression is:

$$\frac{d}{dt}\langle f(p(t))\rangle = \left\langle \frac{\partial f}{\partial p}\bar{\phi} + \frac{1}{2}\frac{\partial^2 f}{\partial p^2}\left(\frac{\partial\bar{\phi}}{\partial\sigma}Q_\sigma\right)^2 \right\rangle. \tag{22}$$

Here, $\langle dW\sigma\rangle=0$. Assuming that the function f(p(t)) has a conditional probability density function g(p, t|$p_b$, $t_b$) conditioned by an initial value $p=p_b$ at $t=t_b$, which function will hereinafter be referred to simply as "conditional probability density function", the expression 22 is again represented using g(p, t|$p_b$, $t_b$) as follows:

$$\int_{-\infty}^{\infty} dp f(p(t)) \frac{\partial}{\partial t} g(p, t \mid p_b, t_b) = \int_{-\infty}^{\infty} dp \left\{\bar{\phi}\frac{\partial f}{\partial p} + \frac{1}{2}\left(\frac{\partial\bar{\phi}}{\partial\sigma}Q_\sigma\right)^2 \frac{\partial^2 f}{\partial p^2}\right\} g(p, t \mid p_b, t_b). \tag{23}$$

Next, this expression is integrated assuming that g(∞, t|$p_b$, $t_b$)=0 and ∂g(∞, t|$p_b$, $t_b$)/∂p=0, to afford the following partial differential equation:

$$\frac{\partial}{\partial t} g(p, t \mid p_b, t_b) = -\bar{\phi}\frac{\partial}{\partial p} g(p, t \mid p_b, t_b) + \frac{1}{2}\left(\frac{\partial\bar{\phi}}{\partial\sigma}Q_\sigma\right)^2 \frac{\partial^2}{\partial p^2} g(p, t \mid p_b, t_b). \tag{24}$$

This expression is a Fokker-Planck equation which represents the evolution of the conditional probability density function based on Miner's law in the case of a random stress load.

Because the coefficients in the above expression are constants, an analytical solution is feasible. If the above expression is solved while setting the initial condition at ($p_b$, $t_b$), there eventually is obtained the following normal distribution type conditional probability density function g(p, t|$p_b$, $t_b$):

$$g(p, t \mid p_b, t_b) = \frac{1}{\left[2\pi\left(\frac{\partial\bar{\phi}}{\partial\sigma}Q_\sigma\right)^2 (t - t_b)\right]^{1/2}} \times \exp\left\{ -\frac{[p - (p_b + \bar{\phi}(t - t_b))]^2}{2\left(\frac{\partial\bar{\phi}}{\partial\sigma}Q_\sigma\right)^2 (t - t_b)} \right\}. \tag{25}$$

Figure 3:
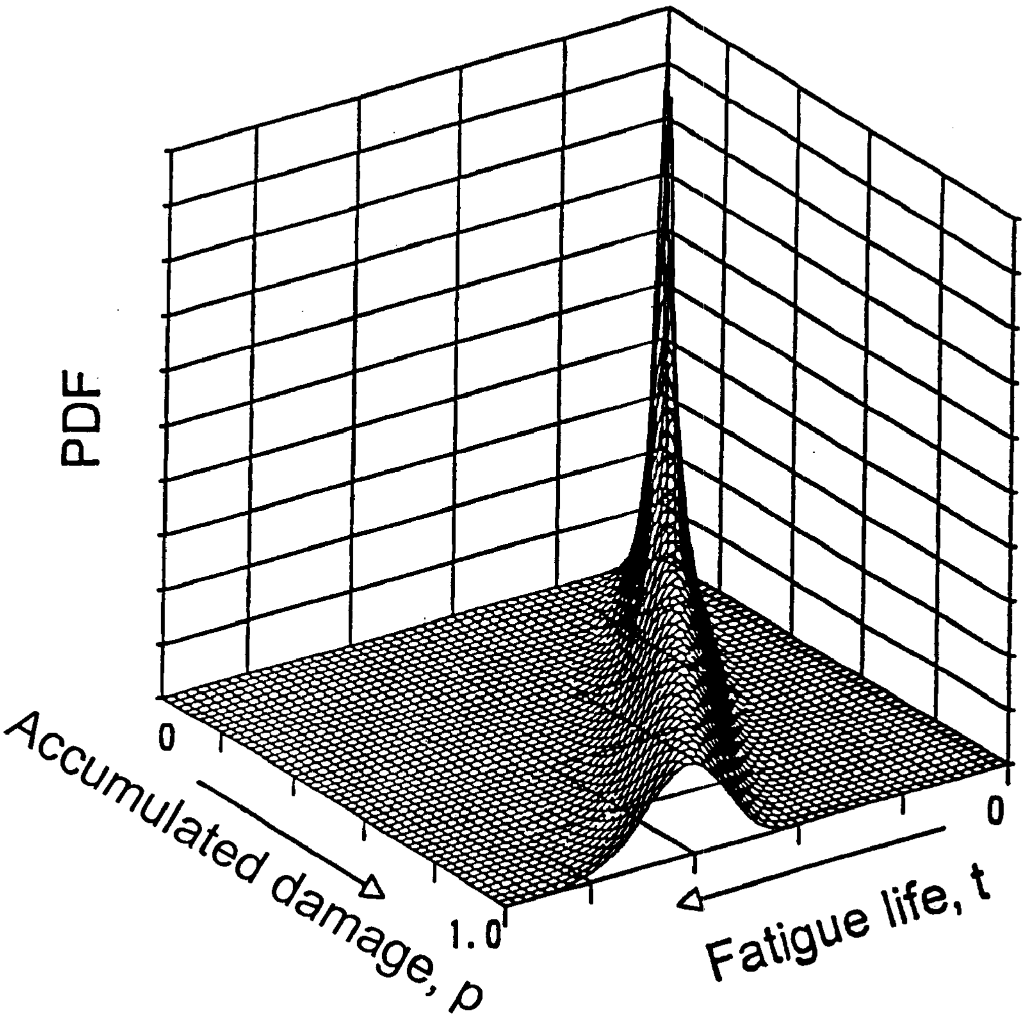
FIG. 3 is a schematic diagram of a distribution shape obtained from an expression 25 under the condition of $(p_b, t_b)=(0, 0)$.

With this probability density function, it is possible to estimate, on the basis of initial damage ($p_b$, $t_b$), a probability density distribution of an accumulated damage quantity at any time during the period from the time when the material begins to undergo damage until the time when it is ruptured or a probability density distribution of the time required until reaching an arbitrary cumulated damage quantity. FIG. 3 shows a schematic diagram of a distribution shape obtained from the expression 25 under the condition of ($p_b$, $t_b$)=(0, 0). In FIG. 3, the right-hand axis represents the time t, while the left-hand axis represents the cumulated damage quantity p, with the vertical axis representing the probability density.

Next, a residual life distribution of the material is estimated from the cumulated damage quantity distribution which evolves in accordance with the Fokker-Planck equation. This is called First Passage Time, meaning a mean time required for a damage value, which is in an unruptured state of $0 \leqq p < 1$, to reach a ruptured state of p=1 in the shortest period of time. This time is obtained as follows in accordance with the Fokker-Planck equation:

$$T(p) = \frac{1-p}{\bar{\phi}} - \frac{\left(\frac{\partial\bar{\phi}}{\partial\sigma}Q_\sigma\right)^2}{4\bar{\phi}^2} \times \left\{\exp\left(-\frac{\bar{\phi}p}{\left(\frac{\partial\bar{\phi}}{\partial\sigma}Q_\sigma\right)^2}\right) - \exp\left(-\frac{\bar{\phi}}{\left(\frac{\partial\bar{\phi}}{\partial\sigma}Q_\sigma\right)^2}\right)\right\} \tag{26}$$

where T(p) is an average residual life estimated from the cumulated damage quantity p at a certain time. The first term on the right side represents a residual life value given by the existing Miner's law in the case where there is no variation in the stress value at every repetition, while the second and subsequent terms represent the influence of variation on the residual life.

An attempt is made here to apply the cumulated damage quantity estimating method described above to fatigue data based on a random load. The procedure is divided into two stages. In the first stage, a stress variation strength is determined by applying the expression 25 to a fatigue life distribution based on a random load in accordance with a method to be described later and in the second stage a residual life distribution, as the final object, is estimated from both the stress variation strength obtained and the expression 26.

The data used are those from a fatigue life distribution based on a random load, which were obtained in a test of aircraft aluminum alloy 2040-T3 conducted by Jakoby et al. The results of this test are not of a narrow-band variation, and a load pattern for simulating taking-off and landing of aircraft is included in part of a random load waveform, but the data in question are rare data well representing the relationship between random load and fatigue life, so the application of this model was tried using the following method.

Jacoby et al.'s test uses a test piece of a notched material (a central elliptic hole plate, a stress concentration coefficient Kt=3.1). The characteristic of the random load used in the test is represented in terms of a mean stress value and a maximum stress value of a nominal stress, which are $\sigma_m$=124.6 MPa and=$\sigma_{max}$=2.2=σmMPa, respectively.

Figure 4:
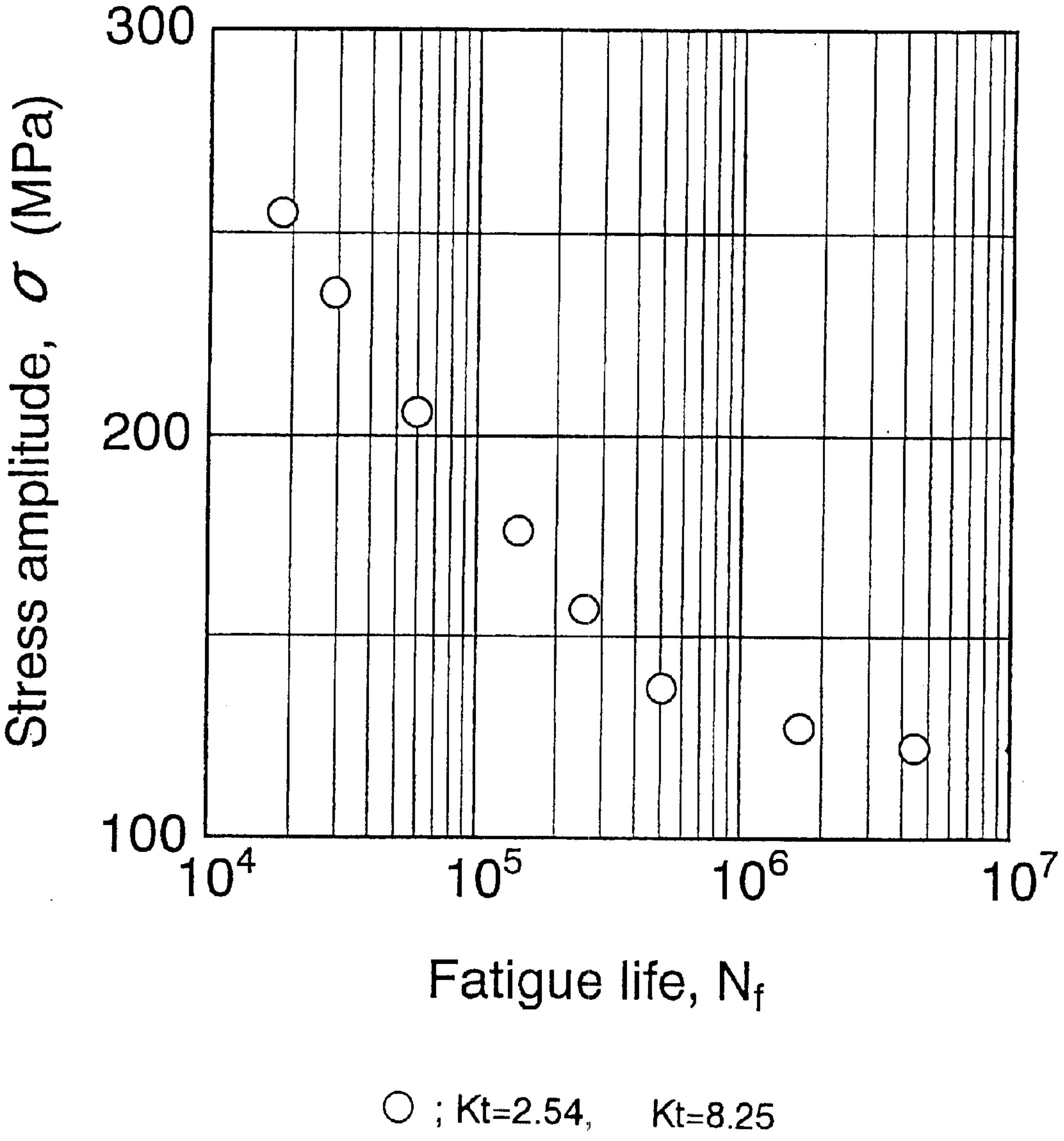
FIG. 4 illustrates Kt=2.54 fatigue data in Jacoby et al.'s paper.
Figure 5:
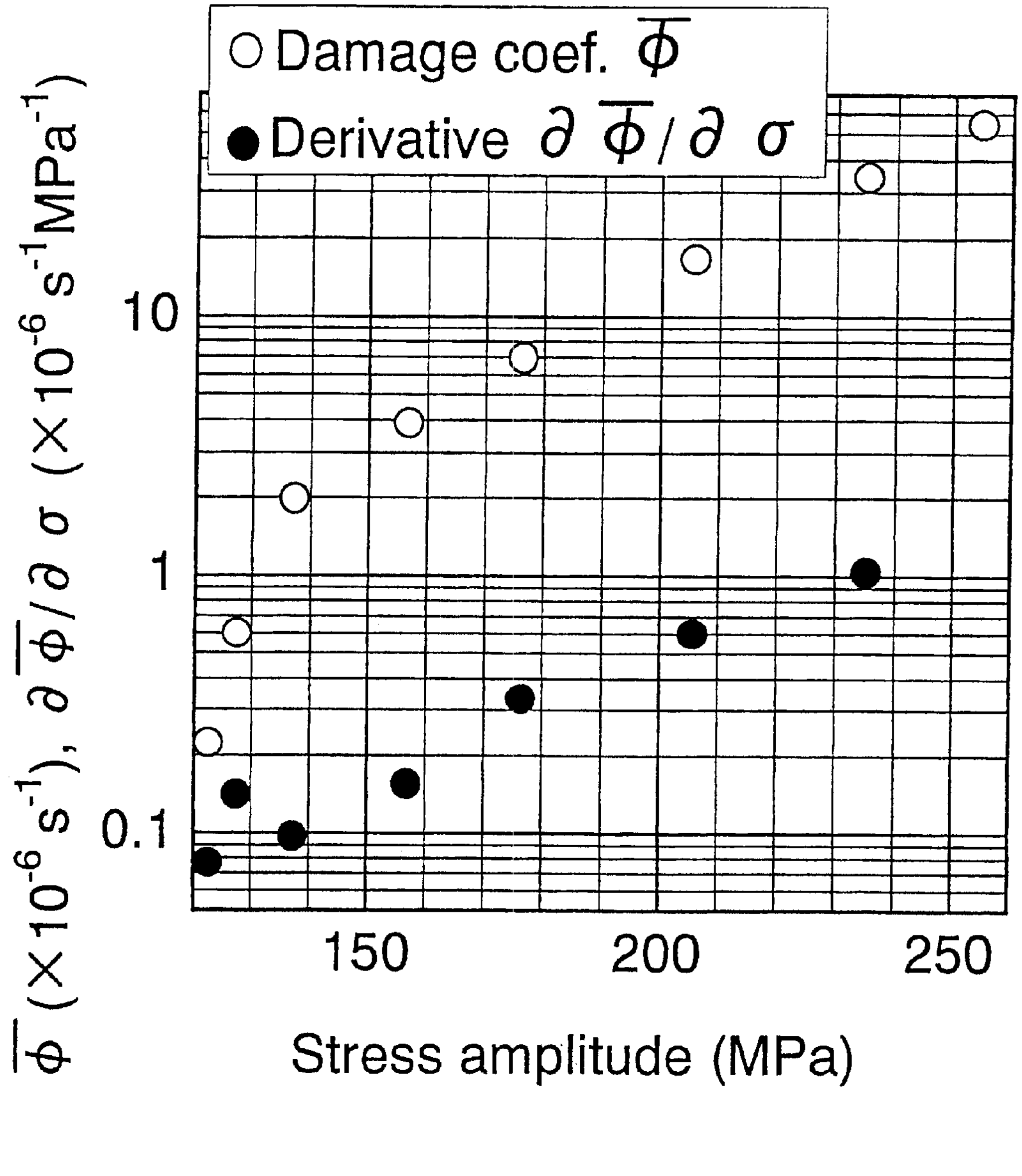
FIG. 5 illustrates damage coefficients at a load repetition frequency set to 1 Hz in the fatigue data of FIG. 4.

In calculating the life distribution in accordance with the expression 25, it is necessary to use fatigue data for estimating a differential coefficient ∂ϕ(mean)/∂σ of the damage coefficient, but fatigue data in the case of Kt=3.1 is not shown in the Jacoby et al.'s paper, Kt=2.54 fatigue data fairly close to Kt=3.1 was used, the fatigue data are indicated with ○ marks in FIG. 4. In the same figure, fatigue life is plotted along the abscissa and stress amplitude along the ordinate. FIG. 5 shows damage coefficients at a load repetition frequency of 1 Hz for the fatigue data of FIG. 4. The ○ marks in FIG. 5 represent damage coefficient values corresponding to reciprocal numbers of the fatigue life values shown in FIG. 4. Also shown are the values of ∂ϕ(mean)/∂σ in terms of ● marks, which were calculated by linear approximation between fatigue data. In FIG. 5, stress amplitude is plotted along the abscissa and damage coefficient values or values of ∂ϕ(mean)/∂σ, calculated by linear approximation between fatigue data, are plotted along the ordinate.

As to the damage coefficient σ(mean)(numerator in the expression 25) related to the mean value of fluctuating stress which is necessary for the calculation of life distribution, there was adopted the reciprocal of a mean value in the fatigue life distribution reported by Jacoby et al. The adoption of the values concerned is based on the judgment that such a difference as poses a problem in a practical range will not occur between the values of ϕ(mean) and ∂σ(mean)/∂σ obtained from Kt=3.1 and Kt=2.54.

Figure 6:
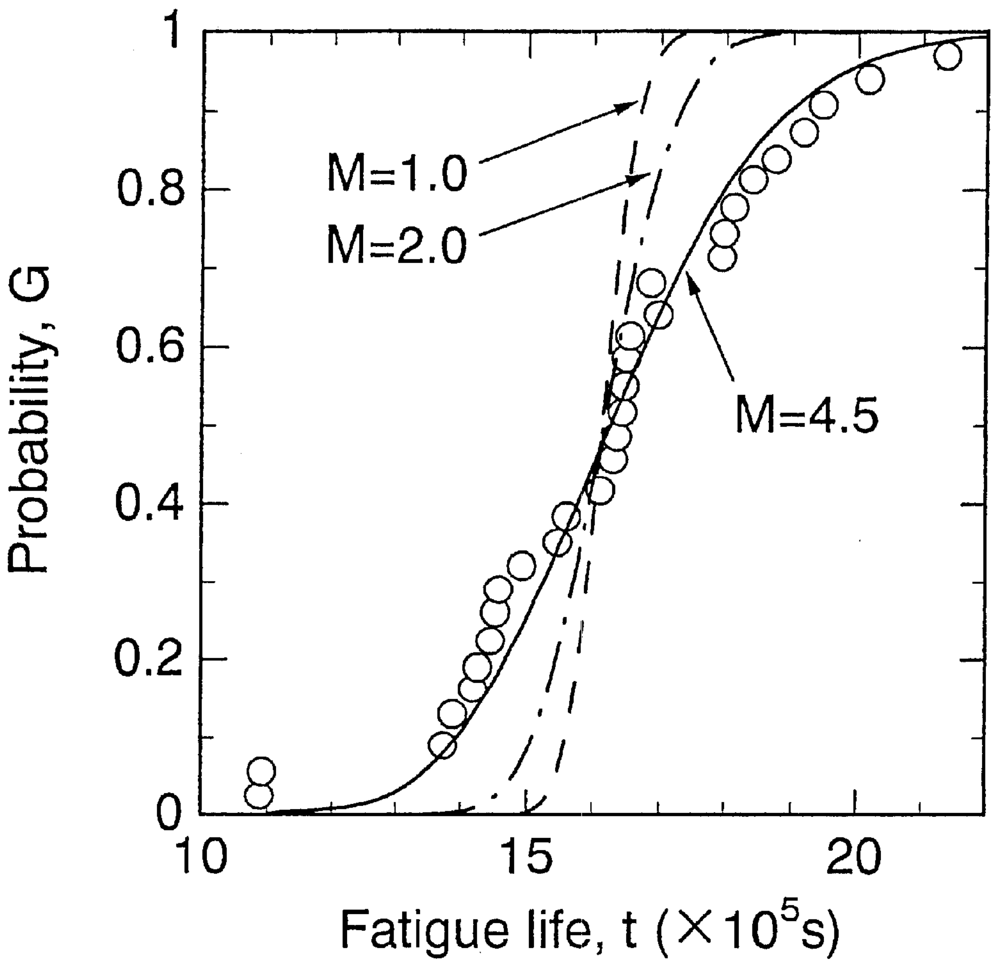
FIG. 6 illustrates Jacoby et al.'s fatigue life distribution with ○ marks and also illustrates a probability distribution of the time required for the material cumulated damage quantity to reach the state of rupture (p=1) under Jacoby et al. experimental conditions.

In FIG. 6, Jacoby et al.'s fatigue life distribution is indicated with ○ marks and the following probability distribution of the time (expression 27) required for the cumulated damage quantity of material to reach the state of rupture (p=1) under the Jacoby et al. test conditions is indicated with a broken line:

$$G(t) = \frac{\int_{-\infty}^{t} g(1, s \mid 0, 0)\,ds}{\int_{-\infty}^{\infty} g(1, s \mid 0, 0)\,ds}. \tag{27}$$

For the estimation of distribution, there were used ($p_b$, $t_b$)=(0, 0), Qσ=1.1 σm MPa, and ∂ϕ(mean)/∂σ=1.41239×$10^{-7}$·$s^{-1}$·$MPa^{-1}$. For convenience's sake, an integral range from −∞ to +∞ was set. In FIG. 6, the time (×$10^5$s) required for the cumulated damage quantity to reach the state of rupture (p=1) is plotted along the abscissa and the probability distribution along the ordinate. In the estimation made by this analysis, the initial assumption that there will be no change in material characteristics during the experiment is valid. Further, the effect of variations in the quality of material prior to the experiment and the effect of variations in fatigue life depending on the stress waveform and the method of experiment are not incorporated in the model. Basically, therefore, a distribution shape is determined by only instantaneous load stress values and the number of times of loading.

Consequently, an estimated rupture probability becomes smaller in the distribution width as compared with the results of the experiment. In view of this point, an attempt was made to define a constant M ("dilatation ratio" hereinafter) which covers the influence of all variations attributable to material characteristics. There was made an attempt to represent the experimental results in terms of a modified stress variation σ'(modified)=MQσξ obtained by formally multiplying the strength Qσ of a stress variation by M times.

The lines in the figure indicate the results of estimation made by adopting a maximum amplitude $\sigma_{max}-\sigma_m$ of a load stress as the stress variation strength Qσ and by using σ'(modified) modified with two types of dilatation ratios M=2.0 and 4.5. It is seen from the figure, the experimental values and estimated values are well in agreement with each other in the case of M=4.5. Although in the model the maximum amplitude was used as the variation strength, a standard deviation of stress variation may be used.

Figure 7:
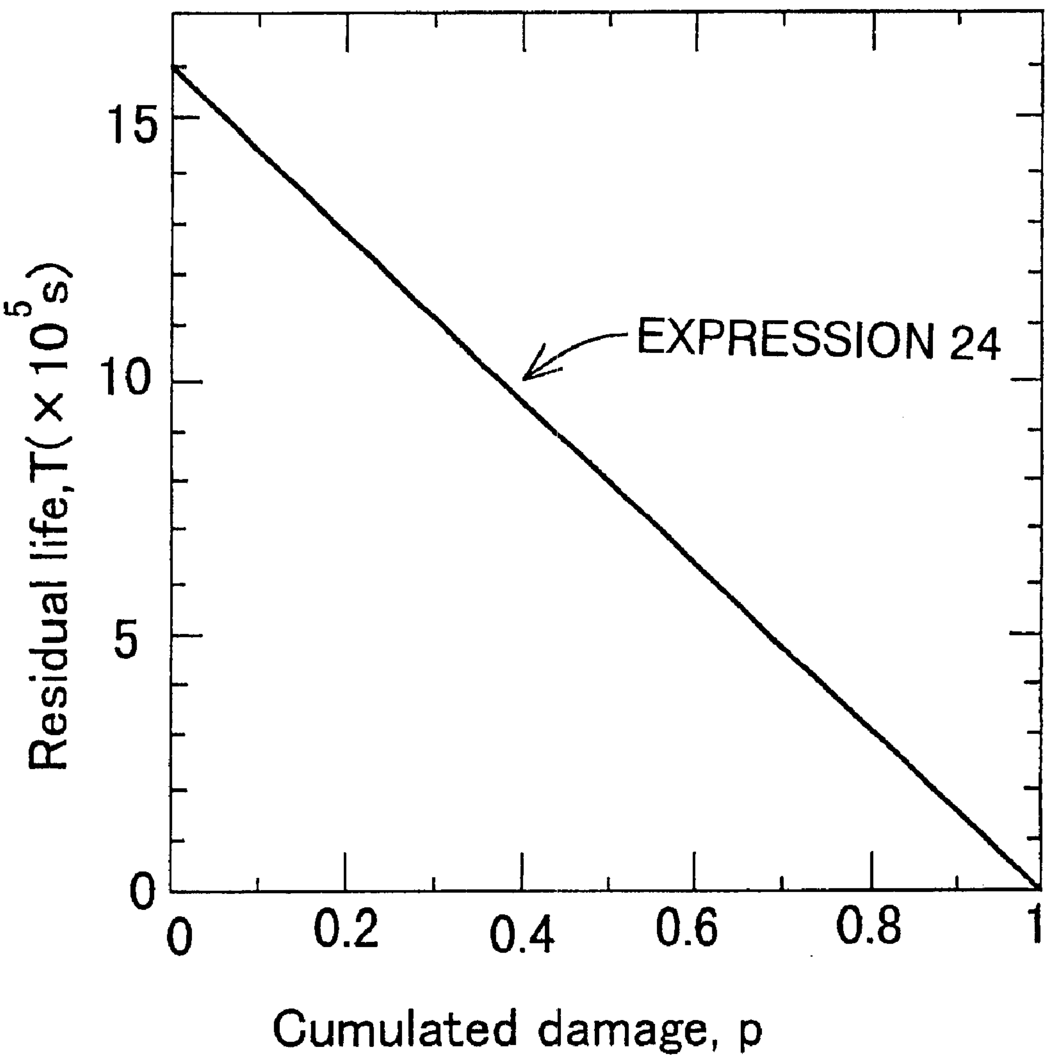
FIG. 7 illustrates an estimated result of a residual life from an arbitrary cumulated damage quantity at M=4.5.

Next, a residual life from an arbitrary accumulated damage quantity was estimated by substituting σ'(modified) in the case of M=4.5 into σ of the expression 26. FIG. 7 shows the results of having estimated a residual life of the same material. In FIG. 7, the accumulated damage quantity is plotted along the abscissa and an estimated residual life (x $10^5$s) along the ordinate.

Because the Jacoby et al.'s experiment was conducted in a region exhibiting a relatively long life, i.e., a region in which the differential coefficient of the damage coefficient is small, the effect of the second and subsequent terms in expression 26 is relatively small in comparison with the first term, and it is therefore estimated that the residual life decreases linearly as the accumulated damage quantity increases.

A method has been proposed for estimating a converted stress distribution which is a value including all errors, such as variations in material quality and variations in load stress, from a fatigue life distribution present on the time base of an S-N diagram through a function which represents an S-N curve. But this method is unsatisfactory in practical use because it is impossible to estimate the development of damage with time.

On the other hand, in the analysis being made there arose the need to apply expression 25 to a fatigue life distribution obtained by experiment in order to obtain the modified stress variation σ'(modified). But this analysis is practically advantageous in that once σ'(modified) is determined, it is possible to estimate a residual life from an accumulated damage quantity at any time during the period from the time when the material concerned begins to be damaged until when it is ruptured. It is also possible to estimate a probability density function of the time required until reaching an arbitrary cumulated damage quantity, further estimate a conditional probability density function in the case of there being an initial damage, and further estimate a residual life from an arbitrary accumulated damage quantity.

In the apparatus life estimating method under a narrow-band random stress variation according to the present embodiment, as set forth above, the damage coefficient ϕ(σ(instantaneous)) is subjected to Taylor expansion at c(mean) or thereabouts, then second and higher orders of infinitesimal terms in expression 13, with the damage coefficient estimated from both mean fluctuating stress value and variation strength, are ignored to give expression 15. Further, substitution of expression 15 into expression 7 can produce Langevin equation 16 which represents Miner's law in a narrow-band random stress variation. Integration can be done in a simple manner because the coefficients of the right side terms in expression 16 are constants, and there is obtained an evolution expression of a normalized cumulated damage quantity p(t) like expression 17.

Consequently, without directly handling a crack whose size and position are clear, it is possible to obtain a mean value and a deviation of damage accumulated in a material at a certain time.

Thus, it is possible to estimate the life of an apparatus under a narrow-band random stress variation without direct calculation for a crack while regarding the crack as being clear in size and position.

Further, by deriving the Fokker-Planck equation 24, corresponding to the Langevin equation and which represents the evolution of a conditional probability density function related to Miner's law, and by solving it, because the coefficients in expression 24 are constants, there eventually can be obtained a normal distribution type conditional probability density function $g(p, t|p_b, t_b)$ which is shown in expression 25.

In this way, even when a damage probability density function and a damage probability distribution in a randomly varying stress amplitude are not clear, a normal distribution type conditional probability density function in a randomly varying amplitude is obtained by solving the Fokker-Planck equation. Further, on the basis of the probability density function it is also possible to estimate a probability density distribution of a cumulated damage quantity at any time during the period from the time when the material concerned begins to be damaged until when it is ruptured or a probability density distribution of the time required until reaching an arbitrary cumulated damage quantity, in the presence of initial damage $(p_b, t_b)$.

This embodiment is a mere illustration, not a limitation, of the invention and therefore various modifications and improvements may be made within the scope and not departing from the gist of the invention.

The following description is now provided about the second embodiment of the invention.

Symbols of mathematical expressions used in this embodiment are explained briefly in FIG. 8.

As to a material damage evolution model using a stochastic differential equation, a change in length of a crack found in a material or a change in state quantity, such as damage quantity accumulated in the material, is grasped as a stochastic process and a random time evolution in a state space is represented.

Figure 9:
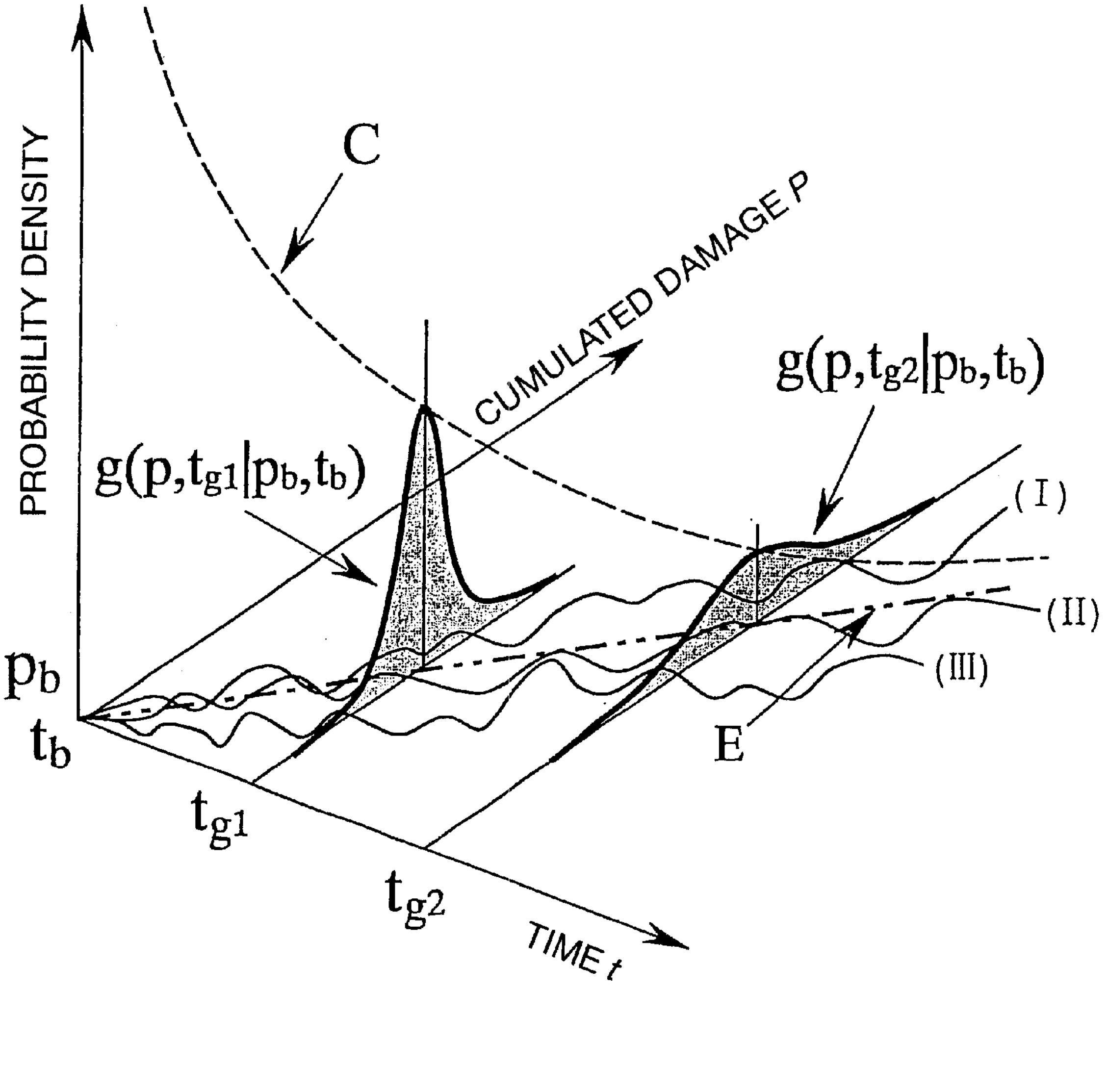
FIG. 9 is a graph which represents changes with time of a probability density function (PDF) estimated from the frequency, or the number of times, of passing through a certain specific region on a p-t plane.

Curves (I) to (III) in FIG. 9 each schematically illustrate a route which damage p(t), accumulated in a material having an initial damage $p=p_b$, traces on p-t plane when a random stress variation and a random temperature variation are applied to the material at the start of the experiment $t=t_b$. It is a stochastic differential equation that is used for describing such a route. In this embodiment the following Langevin equation is used as the stochastic differential equation:

$$dp=a(p, t)dt+b(p, t)dW(t), \tag{28}$$

where a(p, t) stands for the right side of a deterministic differential equation related to the development of damage, b(p, t) stands for the influence of a randomly fluctuating stress on the development of damage, and dW is an increment of a Wiener process. This expression does not represent a damage development route obtained from a single experiment result, but rather represents an entire route described on the basis of many experiment results.

The two distributions $g(p, t|p_b, t_b)$, $t=t_{g1}$, $t_{g2}$ in FIG. 9 represent a time change of a probability density function (PDF) estimated from how often the route described on the p-t plane passes through a certain specific region, as a result of having repeated an experiment under the same initial conditions $(p_b, t_b)$. PDF is a delta function just after the start of the experiment, but with subsequent development of damage, peaks attenuate like a broken line C in the figure and at the same time the width of distribution becomes larger. It is the following Fokker-Planck equation that represents such a change over time of PDF:

$$\frac{\partial g(p, t \mid p_b, t_b)}{\partial t} = -\frac{\partial}{\partial p}[a(p, t)g(p, t \mid p_b, t_b)] + \frac{1}{2}\frac{\partial^2}{\partial p^2}[b(p, t)^2 g(p, t \mid p_b, t_b)]. \tag{29}$$

This equation 28 can be derived from expression 28 by solving expression 28 it is possible to estimate a damage probability distribution and a mean of accumulated damage quantities (a dash-double dot line E in the figure) at any time after the start of experiment, as well as a deviation. Moreover, it is possible to calculate a residual life distribution on the basis of PDF and the way of thinking of First Passage Time which will be described later.

In the following analysis, Robinson's damage fraction rule, as a linear damage rule based on a creep damage degree curve, is extended to the case of a narrow-band random stress amplitude variation and a narrow-band random temperature variation, using the Langevin equation and the Fokker-Planck equation and under certain stress and temperature conditions shown in terms of the Larson-Miller parameter.

More specifically, consider the case where a certain material is in a stress and temperature region involving a creep problem and where both random fluctuating stress and temperature are applied. It is here assumed that these variation values can be approximated by a step function which jumps at every equal interval Δt and maintains certain stress $\theta_i$ and temperature $\theta_i$ until the next jump.

The subscript i represents the number of times of jump at every Δt until a predetermined time. The quantity of damage ("accumulated damage quantity" hereinafter) $P_n$ accumulated in a material at a time corresponding to a certain number of times n after the start of experiment can be expressed as follows by taking the total sum of damage quantities accumulated in the material at every rectangular wave in accordance with the Robinson's damage fraction rule:

$$p_{n\Delta t} = \Delta t \sum_{i=1}^{n} \frac{1}{T_i}. \tag{30}$$

where $P_n\Delta_t$ is an accumulated damage quantity after nΔt seconds and $T_i$ is a creep rupture time of a material when subjected to certain stress and temperature in an undamaged state. In practical use, $T_i$ is considered to be a function $T_i = T_i(\sigma, \theta)$ of stress and temperature and can be estimated from a degree-of-damage curve using the Larson-Miller parameter $\sigma = (k + \log T_i)$, where k is a constant determined by experiment. In the expression 30, $1/T_i$ formally stands for a damage quantity which the material undergoes per unit time. Therefore, a function which represents an accumulated damage quantity per unit time when a test is made at a certain stress a and temperature θ is defined as follows (expression 31) and is called a creep damage coefficient for use as a basic quantity to determine a creep damage accumulation process:

$$\phi_c(\sigma, \theta) = 1/T. \tag{31}$$

With the creep damage coefficient, the quantity of damage dp which is accumulated in a material at a certain time interval dt can be expressed as follows:

$$dp = \phi_c(\sigma, \theta)dt. \tag{32}$$

This is a dynamic equation which represents the development of creep damage with the lapse of time.

Next, the influence of randomly fluctuating stress and temperature in the dynamic equation 32 of damage will be checked. The stress and temperature which fluctuate randomly with time will hereinafter be referred to as fluctuating stress and fluctuating temperature, respectively. Their instantaneous values will be represented by σ(instantaneous) as to the fluctuating stress and by θ(instantaneous) as to the fluctuating temperature. Here, a steady operation of an actually working machine is assumed and it is presumed that both fluctuating stress and temperature fluctuate randomly at a certain time averaged value and thereabouts. Under these assumptions they are resolved into time averaged values σ(mean)(t) and σ(mean)(t) and stochastic variations σ' and θ', as follows:

$$\sigma(t) = \bar{\sigma}(t) + \sigma'(t), \tag{33}$$

$$\theta(t) = \bar{\theta}(t) + \theta'(t). \tag{34}$$

The terms in these expressions are functions of time.

Reference will here made to narrow-band variations (expressions 35 and 36) with the magnitudes of stochastic variations being sufficiently small in comparison with mean values, among the components of the expressions 33 and 34.

$$|\bar{\sigma}| >> |\sigma'|, \tag{35}$$

$$|\bar{\theta}| >> |\theta'|. \tag{36}$$

Probabilistic variations on the right sides of expressions 35 and 36 are represented as follows using parameters $Q_\sigma$ and $Q_{74}$ which represent the strength of variation and noise $\xi_\sigma(t)$ and $\xi_\theta(t)$ which are for expressing stochastic variations:

$$\sigma'(t) = Q_\sigma \xi_\sigma(t), \tag{37}$$

$$\theta'(t) = Q_\theta \xi_\theta(t), \tag{38}$$

where $\xi_i(t)$, $i=\sigma, \theta$ are rapidly changing, irregular, mathematical representations having a Gaussian distribution. In their ensemble mean, $<\xi_i(t)>=0$, the values $\xi_i(t)$ and $\xi_i(t')$ at different times $t \neq t'$ are independent statistically, and an autocorrelation function is represented as $<\xi_i(t)\,\xi_i(t')> = \delta(t-t')$ using Dirac's delta function δ(t). It is assumed that $\xi_\sigma(t)$ and $\xi_\theta(s)$ are independent of each other $<\xi_\sigma(t)\,\xi_{\theta(s)>=}0$. It follows that σ' and θ' possess the following properties:

(a) Ensemble means of σ' and θ' are:

$$<\sigma'>=0. \tag{39}$$

$$<\theta'>=0. \tag{40}$$

(b) Autocorrelation and cross correlation are:

$$<\sigma'(t)\sigma'(t')> = Q_\sigma^2\delta(t-t') \tag{41}$$

$$<\theta'(t)\theta'(t')> = Q_\theta^2\delta(t-t') \tag{42}$$

$$<\sigma'(t)\theta'(s)>=0. \tag{43}$$

(c) σ'(t) and θ'(t) represent a Gaussian distribution.

For estimating an accumulated damage quantity it is necessary to calculate a damage coefficient $\phi_c$(σ(instantaneous), θ(instantaneous)) from the instantaneous value σ(instantaneous) of fluctuating stress and the instantaneous value θ(instantaneous) of fluctuating temperature, but in practical use it is difficult to use fluctuating stress and temperature directly. Therefore, as will be shown below, the damage coefficient $\phi_c$(σ(instantaneous), θ(instantaneous)) is subjected to Taylor expansion with respect to σ(mean) and θ(mean) and a damage coefficient is estimated from the respective mean values and variation strengths, as follows:

$$\phi_c(\tilde{\sigma}, \tilde{\theta}) = \phi_c(\bar{\sigma}, \bar{\theta}) + \frac{\partial \phi_c(\bar{\sigma}, \bar{\theta})}{\partial \sigma}\sigma' + \frac{\partial \phi_c(\bar{\sigma}, \bar{\theta})}{\partial \theta}\theta' + \frac{1}{2}\frac{\partial^2 \phi_c(\bar{\sigma}, \bar{\theta})}{\partial \sigma^2}\sigma'^2 + \frac{1}{2}\frac{\partial^2 \phi_c(\bar{\sigma}, \bar{\theta})}{\partial \theta^2}\theta'^2 + \frac{1}{2}\frac{\partial^2 \phi_c(\bar{\sigma}, \bar{\theta})}{\partial \sigma \partial \theta}\sigma'\theta' + \dots \tag{44}$$

The expressions 33 and 34 were used here. But under the conditional expressions 35 and 36 of narrow-band variation, the terms of the second and higher orders in expression 44 become very small in comparison with the other terms. Therefore, infinitesimal terms of the second and higher orders in expression 44 are ignored and a damage coefficient is approximated in accordance with the following expression:

$$\phi_c(\bar{\sigma},\bar{\theta}) = \phi_c(\bar{\sigma},\bar{\theta}) + \frac{\partial\phi_c(\bar{\sigma},\bar{\theta})}{\partial\sigma}\sigma' + \frac{\partial\phi_c(\bar{\sigma},\bar{\theta})}{\partial\theta}\theta'. \tag{45}$$

Substitution of expression 45 into expression 32 gives:

$$dp = \bar{\phi}_c dt + \frac{\partial\bar{\phi}_c}{\partial\sigma}Q_\sigma dW_\sigma + \frac{\partial\bar{\phi}_c}{\partial\theta}Q_\theta dW_\theta. \tag{46}$$

This is the Langevin equation which represents Robinson's damage fraction rule in the case of a narrow-band random stress and temperature variation. In the above expression, $\phi_c$(mean) represents $\phi_c$(σ(mean), θ(mean)), and dWσ(t) and dWθ(t) represent increments of a Wiener process with respect to σ' and θ', respectively. Between $dW_i$ and $\xi_i$, i=0, θ, there exists a relationship of $dW_i=\xi_i dt$.

It is possible to integrate easily because the coefficients of the terms on the right side of the expression 46 are constants, and an evolution expression of p(t) is obtained as follows:

$$p(t) = p_b + \int_{t_b}^{t}\bar{\phi}_c dt + \int_{t_b}^{t}\frac{\partial\bar{\phi}_c}{\partial\sigma}Q_\sigma dW_\sigma + \int_{t_b}^{t}\frac{\partial\bar{\phi}_c}{\partial\theta}Q_\theta dW_\theta, \tag{47}$$

where $t_b$ is a start time of test and $p_b$ is an initial damage quantity already present in the material at time $t_b$. This expression represents the results of innumerable creep tests which begin with the initial state ($p_b$, $t_b$). But what is needed in practical use is an expectation of the damage accumulated at time t, so by taking the ensemble mean <p> in the above expression it is possible to estimate an evolution of a mean value as follows:

$$\langle p\rangle = p_b + \phi_c t. \tag{48}$$

In this model, as is apparent from expression 48, the mean value evolution of damage coincides with a damage evolution which is calculated in accordance with Robinson's damage fraction rule by a conventional method in a variation-free state. Further, a square deviation of variation in the quantity of accumulated damage is:

$$\begin{aligned}\langle[p(t)-\langle p(t)\rangle][p(s)-\langle p(s)\rangle]\rangle &= \left\langle\left\{\alpha\int_{t_b}^{t} dW_\sigma(t') + \beta\int_{t_b}^{t} dW_\theta(t')\right\}\times\right.\\ &\left.\left\{\alpha\int_{t_b}^{s} dW_\sigma(s') + \beta\int_{t_b}^{s} dW_\theta(s')\right\}\right\rangle\\ &= (\alpha^2+\beta^2)(t-t_b).\end{aligned} \tag{49}$$

In this case, the values of α and β were set at α=(∂$\phi_c$(mean)/∂σ)Q σ and β=(∂$\phi_c$(mean)/∂θ)Q θ. It follows that the damage distribution at any time in the period from the time when the material begins to be damaged until when it is ruptured has an extent proportional to the gradient of a degree-of-damage curve based on creep, stress and temperature variation strengths, and a square root of the time elapsed.

In the estimation of material damage and life, not only a mean value and a deviation of the damage accumulated in the material at a certain time, but also a PDF and a probability distribution of damage play an important role. A normal distribution, a logarithmic normal distribution, and a Weibull distribution, which are generally employed, are for the probability of rupture, but by solving the Fokker-Planck equation it is possible to grasp a time change of DPF with respect to the quantity of damage accumulated in the material.

The Fokker-Planck equation can be derived from the Langevin equation. In this analysis, the following partial differential equation is obtained from the expression 46:

$$\frac{\partial}{\partial t}g(p,t\mid p_b,t_b) = -\bar{\phi}_c\frac{\partial}{\partial p}g(p,t\mid p_b,t_b) + \frac{1}{2}(\alpha^2+\beta^2)\frac{\partial^2}{\partial p^2}g(p,t\mid p_b,t_b). \tag{50}$$

This equation is the Fokker-Planck equation of the fatigue damage accumulation process for the narrow-band random stress amplitude variation and the narrow-band random temperature variation. In this equation, g(p, t|$p_b$, $t_b$) is a conditional PDF conditioned by the initial value (p, t)=($p_b$, $t_b$). Because the coefficients of the terms in the above equation are constants, it is possible to solve g(p, t|$p_b$, $t_b$) analytically. The final solution is the following normal distribution:

$$g(p,t\mid p_b,t_b) = \frac{1}{[2\pi(\alpha^2+\beta^2)(t-t_b)]^{1/2}}\times\exp\left\{-\frac{[p-(p_b+\bar{\phi}_c(t-t_b))]^2}{2(\alpha^2+\beta^2)(t-t_b)}\right\}. \tag{51}$$

With this expression, in the presence of an initial damage ($p_b$, $t_b$), it is possible to estimate a PDF probability density distribution of an accumulated damage quantity at any time in the period from the time when the material begins to undergo damage until when it is ruptured or estimate a DPF of the time required for reaching an arbitrary accumulated damage quantity.

Further, on the basis of the way of thinking of First Passage Time in residual life estimation it is possible to estimate a residual life distribution of the material. In this analysis, First Passage Time means an average time required for a damage value which is in an unruptured state of 0≦p<1 to reach a ruptured state of p=1 in a short period. This time can be obtained as follows using the Fokker-Planck equation and the solution thereof:

$$T(p) = \frac{1-p}{\bar{\phi}_c} - \frac{\alpha^2+\beta^2}{4\bar{\phi}_c^{\,2}}\times\left\{\exp\left(\frac{-\bar{\phi}_c p}{\alpha^2+\beta^2}\right) - \exp\left(\frac{-\bar{\phi}_c}{\alpha^2+\beta^2}\right)\right\}, \tag{52}$$

where T(p) is an average residual life predicted from a cumulated damage quantity p at a certain time. The first term on the right side stands for a residual life value given by the existing Robinson's damage fraction rule in the absence of variation in stress amplitude and temperature at every repetition. The second and subsequent terms represent the influence of variation on the residual life.

In the apparatus life estimating method under a narrow-band random stress variation according to this embodiment, as set forth above, the damage coefficient $\phi_c$(σ(instantaneous), 0(instantaneous)) is subjected to Taylor expansion with respect to σ(mean) and θ(mean) and infinitesimal terms of the second and higher orders in expression 44 with a damage coefficient estimated from a fluctuating stress mean value and variation strength are ignored to provide expression 45. Further, substitution of expression 45 into the expression 32 produces the Langevin equation 46 which represents the Robinson's damage fraction rule under a narrow-band random stress variation and a narrow-band random temperature variation. Integration can be done easily because the coefficients of the right side terms in expression 46 are constants, and there is obtained an evolution expression of accumulated damage quantity p(t) which is normalized like expression 47.

In this way it is possible to obtain a mean value and a deviation of damage accumulated in a material at a certain time in the case where both stress and temperature fluctuate randomly in a narrow band.

Accordingly, it is possible to accurately estimate the life of an apparatus involving randomly fluctuating stress and temperature.

Further, by deriving the Fokker-Planck equation 50, which represents the evolution of a conditional probability density function on the Robinson's damage fraction rule corresponding to the Langevin equation, and by solving it, because the coefficients in equation 50 are constants, there eventually is obtained the normal distribution type conditional probability density function $g(p, t|p_b, t_b)$ shown in expression 51.

Thus, by solving this Fokker-Planck equation there is obtained the normal distribution type conditional probability density function in a randomly fluctuating condition of both stress and temperature. With this probability function, moreover, in the presence of an initial damage $(p_b, t_b)$ it is possible to estimate a probability density distribution of an accumulated damage quantity at any time in the period from the time when the material concerned begins to undergo damage until when it is ruptured or a probability density distribution of the time required for reaching an arbitrary accumulated damage quantity. Further, on the basis of the Fokker-Planck equation it is possible to obtain a predictive expression of a residual life from an arbitrary accumulated damage quantity of an already damaged material.

Thus, it is possible to accurately estimate the life of a gas apparatus in which both stress and temperature fluctuate.

This embodiment is an illustration of the invention and therefore various modifications and improvements may be made within the scope not departing from the gist of the invention.

Next, the life of a gas apparatus in the use of a ceramic material will be estimated in accordance with a ceramic crack development rule.

The behavior of SCG is usually represented in terms of a relationship between a stress intensity factor K, and a crack growth rate v, as follows:

$$\frac{da}{dt} = v(K_I), \tag{53}$$

where a is the length of a crack and $K^I$ is a stress intensity factor of I mode. In most structural ceramic materials, a power rule type crack growth rate is used as follows:

$$v = A\left(\frac{K_I}{K_{IC}}\right)^n, \tag{54}$$

where $K_{IC}$ is a critical stress intensity factor and A and n are material constants. The stress intensity factor is associated with load stresses σ and a as follows:

$$K_I = \sigma Y \sqrt{a}, \tag{55}$$

where Y is a parameter relating to the shape of crack.

An evaluation will now be made about the evolution of crack length and the evolution of a probability density function of crack length in a randomly fluctuating state of a load stress, in connection with the following ceramic crack growth rate:

$$\frac{da}{dt} = A\left(\frac{Y\sigma\sqrt{a}}{K_{IC}}\right)^n, \tag{56}$$

Based on the expressions 53 to 55. In this analysis it is assumed that the stress indicates a narrow-band random variation.

Now, the influence of a stress variation on the crack development rate da/dt is represented in terms of additive terms for the expression 56 as follows:

$$\frac{da}{dt} = A\left(\frac{Y\sigma\sqrt{a}}{K_{IC}}\right)^n + \alpha\xi(t), \tag{57}$$

where the first term on the right side stands for the development rate of a crack under the condition that the stress σ is constant. This corresponds to the crack development rate in a stress variation-free state to which the crack development expression is usually applied. The second term on the right side represents the influence of a random variation of a load stress upon the crack development rate. The coefficient σ is a coefficient related to the strength of variation and ξ(t) is a random function having characteristics such that its ensemble mean is $\langle\xi(t)\rangle=0$ and autocorrelation function is $\langle\xi(t)\xi(t-\tau)\rangle=\delta(\tau)$; $\tau=0$.

As one attempt, a case where stress is fluctuating randomly with time relative to a mean value is assumed as follows:

$$\sigma(t)=\bar{\sigma}(t)+\sigma'(t), \tag{58}$$

where σ(instantaneous) stands for an instantaneous value of a fluctuating stress, σ(mean) stands for a time averaged value, and σ' is a variation. It is assumed that this stress variation represents the following properties:

(a) Ensemble mean of σ is:

$$\langle\sigma'\rangle=0. \tag{59}$$

(b) σ' is represented as follows using a random variable ξ(t) and a constant Q relating to the strength of variation:

$$\sigma'=Q\xi(t), \tag{60}$$

and its autocorrelation function becomes:

$$\langle\sigma'(t)\sigma'(t+\tau)\rangle=Q^2\delta(\tau). \tag{61}$$

(c) σ' shows a Gaussian distribution.

(d) Since a random variation in a narrow band is considered, $$|\bar{\sigma}|\gg|\sigma'|. \tag{62}$$

The crack development rate, which results from having applied a fluctuating stress with the above properties to a material, becomes a random variable. To obtain a crack development rate at this time, expression 58 is substituted into expression 56. But, taking into account that the fluctuating stress possesses the above properties (d), expression 56 is subjected to Taylor expansion with respect to a(mean) as follows:

$$\frac{da}{dt} = \left(\frac{Y\sqrt{a}}{K_{IC}}\right)^n \bar{\sigma}^n + \left(\frac{Y\sqrt{a}}{K_{IC}}\right)^n n\bar{\sigma}^{n-1}(\sigma - \bar{\sigma}). \tag{63}$$

Using the expression 58 gives:

$$\frac{da}{dt} = \gamma a^{n/2} + \frac{n\gamma}{\bar{\sigma}} a^{n/2} Q\xi(t). \tag{64}$$

This is a Langevin equation on the development of a crack in a fluctuating stress loaded state. In this equation, $\gamma = A(Y\sigma(\text{mean})/K_{IC})^n$. Expression 64 corresponds to expression 57, in which the coefficient of the strength of stress variation in the second term on the right side can be determined as follows:

$$\alpha = \frac{n\gamma}{\bar{\sigma}} a^{n/2}. \tag{65}$$

The expression 64 becomes a linear equation when n=0, 2, but when n=0 it becomes a commonly used deterministic equation which is not related to the analysis being considered. In a general condition of n>0 and n≠0, 2, expression 64 becomes a non-linear equation. This analysis covers the latter general case. But with this expression as it is, there is no choice but to rely on a solution using a numerical analysis. Provided, however, that an analytical solution can be made by conducting the following change of variable:

$$z(t) = \sigma(t)^{1-n/2}. \tag{66}$$

In this case, because:

$$\frac{dz}{dt} = \frac{2-n}{2} a^{-n/2} \frac{da}{dt}, \tag{67}$$

expression 64 can be converted to the following Ito type stochastic differential equation:

$$dz = \frac{2-n}{2}\gamma dt + \frac{n(2-n)}{2}\,\frac{\gamma}{\bar{\sigma}} Q dW(t). \tag{68}$$

where dW(t) is an increment of a one-dimensional Wiener process. In this equation, the first term coefficient (2−n/2)γ on the right side which is an advection term and the coefficient [n(2−n)/2](γ]/σ(mean))Q of the second term which is a diffusion term can be treated as constants, thus permitting easy integration and giving:

$$z(t) = z(t_b) + \frac{2-n}{2}\gamma(t - t_b) + \frac{n(2-n)}{2}\,\frac{\gamma}{\bar{\sigma}} Q(W(t) - W(t_b)), \tag{69}$$

where $z(t_b)$ is an initial value of z(t) and $t_b$ is a start time of the stochastic process.

Lastly, a study will be made of the influence of a narrow-band random stress variation in a ceramic on the basis of Miner's law. In this analysis a life value of silicon nitride given by Ohji et al. is used.

A relationship between stress a loaded to a material and the material life $t_L$ has been given by Ohji et al. as follows:

$$t_L = \frac{2K_{IC}^2}{\sigma_{IC}^2 Y^2 A(n-2)}\left(\frac{\sigma_{IC}}{\sigma}\right)^n. \tag{70}$$

This expression represents a residual life in a loaded state of stress σ to an undamaged material. Now, a function having the following dimension of [1/time] and representing damage which a material undergoes per unit time is defined and is called a damage coefficient:

$$\phi(\sigma) \equiv \frac{\sigma_{IC}^2 Y^2 A(n-2)}{2K_{IC}^2}\left(\frac{\sigma}{\sigma_{IC}}\right)^n. \tag{71}$$

It is here assumed that a fatigue test was started at time $t_b$ and that the material ruptured at time $t_e$ after repetition of $N_f$ times. This time section $[t_b, t_e]$ is divided into $N_f$ number of infinitesimal time intervals Δt equal in length, which are then numbered in the order of time.

$$\Delta t = \frac{1}{N_f}(t_e - t_b). \tag{72}$$

$$t_b = t_1, t_2, t_3, \ldots t_i, t_{Nf} = t_e. \tag{73}$$

If the value of stress imposed on the material at time $t_i$ is assumed to be $\sigma(t_i) = \sigma_i$, the damage $\Delta p_i$ which the material undergoes in the period from $t_i$ to $t_i + \Delta t$ can be expressed as follows:

$$\Delta p_i = \phi(\sigma_i)\Delta t. \tag{74}$$

Thus, the damage $p(t_N)$ accumulated in the material during the period from time $t_b$ to time $t_N$ can be given by taking the total sum of damages $\Delta p_i$ which the material undergoes at infinitesimal time intervals as follows:

$$p(t_N) = \sum_{i=1}^{N} \Delta p_i. \tag{75}$$

If a limit of Δt→0 is taken in the expression 75, the following results:

$$dp = \phi(\sigma)dt. \tag{76}$$

Now, the influence of fluctuating stress on expression 76 will be checked. Fluctuating stress is resolved into a deterministic term σ(mean)(t) and a stochastic variation σ' as follows:

$$\sigma(t) = \bar{\sigma}(t) + \sigma'(t). \tag{77}$$

The terms in these expressions are constants of time.

Now, a narrow band variation is considered such that when fluctuating temperature and stress are resolved like expression 77, the magnitude of the stochastic variation is sufficiently small in comparison with the magnitude of the deterministic term and can be expressed as follows:

$$|\bar{\sigma}| >> |\sigma'|. \tag{78}$$

Further, it is assumed that the stochastic variation σ' possesses the following properties:

(a) Ensemble mean of σ' is:

$$\langle\sigma'\rangle = 0. \tag{79}$$

(b) Autocorrelation function of σ' is:

$$\langle \sigma'(t)\sigma'(t+\tau)\rangle = Q_\sigma \delta(\tau). \tag{80}$$

(c) σ' shows a Gaussian distribution.

Under these conditions, the expression 76 is subjected to Taylor expansion with respect to σ(mean).

$$\frac{dp}{dt} = \gamma\left(\frac{\overline{\sigma}}{\sigma_{IC}}\right)^n + \frac{n\gamma}{\overline{\sigma}}\left(\frac{\overline{\sigma}}{\sigma_{IC}}\right)^n(\sigma - \overline{\sigma}) + \ldots \tag{81}$$

Infinitesimal terms of second and higher orders in the above expression 81 are ignored because in a narrow-band variation they are small in comparison with the other terms, and the use of expression 77 results in:

$$\frac{dp}{dt} = \gamma\left(\frac{\overline{\sigma}}{\sigma_{IC}}\right)^n + \frac{n\gamma}{\overline{\sigma}}\left(\frac{\overline{\sigma}}{\sigma_{IC}}\right)^n\sigma'. \tag{82}$$

As a result, the following stochastic differential equation on probabilistic damage accumulation is obtained:

$$dp = \gamma\left(\frac{\overline{\sigma}}{\sigma_{IC}}\right)^n dt + \frac{n\gamma}{\overline{\sigma}}\left(\frac{\overline{\sigma}}{\sigma_{IC}}\right)^n Q\,dW(t), \tag{83}$$

where dWσ(t) is an increment of Wiener process on σ'. Because the coefficients of the right side terms in expression 83 are constants, an evolution of p(t) can be obtained merely by integration.

$$p(t) = p_b + \int_{t_b}^{t}\overline{\phi}\,dt + \int_{t_b}^{t}\frac{\partial\overline{\phi}}{\partial\sigma}Q_\sigma dW_\sigma, \tag{84}$$

where $p_b$ is an initial damage already present in the material at time $t_b$. Accordingly, an expectation of damage accumulated at a certain time t becomes as follows by taking the above ensemble mean:

$$\langle p\rangle = p_b + \overline{\phi}t. \tag{85}$$

This coincides with the evolution in a variation-free state. Further, a square deviation of cumulated damage variation becomes as follows:

$$\begin{aligned}\langle[p(t)-\langle p(t)\rangle]\rangle\langle[p(s)-\langle p(s)\rangle]\rangle &= (\overline{\phi}Q_\sigma)^2\left\langle\left(\int_{t_b}^{t}dW_\sigma\right)\left(\int_{t_b}^{s}dW_\sigma\right)\right\rangle \\ &= (\overline{\phi}Q_\sigma)^2(t-t_b).\end{aligned} \tag{86}$$

In estimating material damage and life, not only a mean value and a deviation of damage accumulated in the material at a certain time, but also a probability density distribution and a probability distribution of damage play an important role. Generally, the probability density distribution of damage is represented in terms of a normal distribution or a logarithmic normal distribution, but the distribution in a randomly fluctuating state of stress is not clear at present. Here, an attempt is made to derive a Fokker-Planck equation equivalent to the following Langevin equation 87 and a probability density distribution function as a solution of the equation and to determine a probability distribution shape of damage accumulated in a material at a certain time and a parameter which features the distribution shape:

$$dp = \overline{\phi}dt + \frac{\partial\overline{\phi}}{\partial\sigma}Q_\sigma dW_\sigma. \tag{87}$$

Now, a function f(p(t)) of a random variable p(t) is introduced. A change of function $f$ between infinitesimal time intervals dt is expressed as follows:

$$\begin{aligned}df(p(t)) &= f(p(t)+dp(t)) - f(p(t)) \\ &= \frac{\partial f}{\partial p}dp + \frac{1}{2}\frac{\partial^2 f}{\partial p^2}[dp]^2 + \ldots\ .\end{aligned} \tag{88}$$

Expansion is made up to the second order power of dp to take into account a contribution proportional to an infinitesimal time interval dt of a high order differential. Further, substitution of the expression 83 and arrangement give:

$$df(p(t)) = \left\{\overline{\phi}\frac{\partial f}{\partial\varepsilon} + \frac{1}{2}\left(\frac{\partial\overline{\phi}}{\partial\sigma}\right)^2\frac{\partial^2 f}{\partial p^2}\right\}dt + \frac{\partial\overline{\phi}}{\partial\sigma}\frac{\partial f}{\partial p}dW_\sigma, \tag{89}$$

where there were used $(dt)^2 \to 0$, dt; $dW\sigma \to 0$, $(dW\sigma)^2 = dt$.

An ensemble mean of both sides in this expression is:

$$\frac{d}{dt}\langle f(p(t))\rangle = \left\langle\frac{\partial f}{\partial p}\overline{\phi} + \frac{1}{2}\frac{\partial^2 f}{\partial p^2}\left(\frac{\partial\overline{\phi}}{\partial\sigma}\right)^2\right\rangle, \tag{90}$$

where $\langle dW\sigma\rangle = 0$. Assuming that at $t = t_b$ the function f(p(t)) has a conditional probability density function ("conditional PDF" hereinafter) $g(p, t|p_b, t_b)$ conditioned by an initial value $p = p_b$, the expression 90 may be rewritten as follows using $g(p, t|p_b, t_b)$:

$$\int_{-\infty}^{\infty}dp\,f(p(t))\frac{\partial}{\partial t}g(p, t\mid p_b, t_b) = \int_{-\infty}^{\infty}dp\left\{\overline{\phi}\frac{\partial f}{\partial p} + \frac{1}{2}\left(\frac{\partial\overline{\phi}}{\partial\sigma}\right)^2\frac{\partial^2 f}{\partial p^2}\right\}g(p, t\mid p_b, t_b). \tag{91}$$

Given that $g(\infty, t|p_b, t_b) = g(-\infty, t|p_b, t_b) = 0$, $\partial g(\infty, t|p_b, t_b)/\partial p = \partial g(-\infty, t|p_b, t_b)/\partial p = 0$, integration of this expression gives the following partial differential equation:

$$\frac{\partial}{\partial t}g(p, t\mid p_b, t_b) + \overline{\phi}\frac{\partial}{\partial p}g(p, t\mid p_b, t_b) - \frac{1}{2}\left(\frac{\partial\overline{\phi}}{\partial\sigma}\right)^2\frac{\partial^2}{\partial p^2}g(p, t\mid p_b, t_b) = 0. \tag{92}$$

This is a Fokker-Planck equation which represents the evolution of a conditional PDF related to a creep strain.

According to the invention, as is apparent from the above description, in a method for estimating the life of an apparatus under a random stress amplitude variation, involving determining a probability density function of an accumulated damage quantity from a damage accumulation process based on Miner's law and estimating the life of the apparatus under a random stress amplitude variation, a damage coefficient indicative of a damage quantity for one time is approximated by a linear expression and the random stress amplitude variation σ(t)(instantaneous) is represented by the sum of a time averaged value σ(t)(mean) and a stochastic variation σ'(t) to derive a Langevin equation which represents Miner's law for a narrow-band random stress amplitude variation from the standpoint of continuum damage dynamics, whereby an evolution model of an accumulated damage quantity can be shown. Consequently, it is possible to estimate the apparatus life without directly handling a crack whose size and position are clear.

According to the invention, moreover, in a method for estimating a creep life of an apparatus under a random stress variation and a random temperature variation, involving determining a probability density function of an accumulated damage quantity from a damage accumulation process based on Robinson's damage fraction rule and estimating the apparatus life on the basis of the probability density function, a damage coefficient indicative of a damage quantity per unit time is approximated by a linear expression when the random stress variation and the random temperature variation are in a narrow band and the random stress variation σ(t)(instantaneous) is represented by the sum of a time averaged value σ(t)(mean) and a stochastic variation σ'(t), while the random temperature variation θ(t) (instantaneous) is represented by the sum of a time averaged value θ(t)(mean) and a stochastic variation θ'(t), whereby it is possible to derive a Langevin equation with a stochastic process included in a dynamic equation which represents a damage evolution in terms of Robinson's damage fraction rule in constant stress and temperature conditions. This Langevin equation includes both a stochastic process based on stress variation and a stochastic process based on temperature variation. In this way it is possible to present an evolution model of an accumulated damage quantity for both stress and temperature.

Thus, it is possible to accurately estimate the life of an apparatus in which both stress and temperature fluctuate.

More specifically, in Silberschmidt's study there was provided a non-linear Langevin equation 1 for damage accumulation based on a randomly fluctuating minor-axis tensile load (I mode). In expression 1, f(p) is the right side of a deterministic equation for a mode I damage, such as that shown in the expression 2, L(t) is a stochastic term, and A, B, C, and D are experimental values, but g(p) is undetermined, not providing a clear functional form, which is insufficient. In the invention, the influence of stress and temperature variations on the accumulated damage quantity can be determined clearly from stress and temperature differential coefficients of a degree-of-damage curve. That is, Silberschmidt's study could not show an exact damage evolution model in both stress and temperature fluctuating conditions, but according to the invention a damage evolution model in both stress and temperature fluctuating conditions can be shown clearly from stress and temperature differential coefficients.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments chosen and described in order to explain the principles of the invention and its practical application to enable one skilled in the art to use the invention in various embodiments and with various modifications as are suited to the particular use contemplated. It is intended that the scope of the invention be defined by the claims appended hereto, and their equivalent.

What is claimed is:

1. A method for estimating a life of an apparatus under a narrow-band random stress amplitude variation, including the steps of:

sampling and storing data on stress, strain, and temperature which occur in an apparatus during operation;

analyzing the stored data to determine a random stress amplitude variation σ(t) (instantaneous) being imposed on the material of the apparatus;

determining a model expression of load variation by the following conditions of:

i) converting the random stress amplitude variation σ(t) (instantaneous) determined in the above step into a sum of a time averaged value σ(t) (mean) and a stochastic variation σ'(t) which is a stress varying at the averaged value and thereabouts, and ii) when the random stress amplitude variation σ(t) (instantaneous) determined in the above step is in a narrow band, approximating a damage coefficient indicative of a quantity of damage accumulated in the material of the apparatus per one stress amplitude variation by a linear expression which is a sum of a quantity of damage which the material undergoes from the stress at the time averaged value σ(t) (mean) and a quantity of damage which the material undergoes from the stress at the stochastic variation σ'(t):

determining a theoretical correction value of damage accumulation based on statistic characteristic data on a life of the material itself;

completing an estimating expression of damage accumulation by substituting thereinto the model expression of load variation and the theoretical correction value of damage accumulation; and calculating the life of the apparatus by the completed estimating expression of damage accumulation.

2. The apparatus life estimating method under the narrow-band random stress amplitude variation according to claim 1, wherein the estimating expression of damage accumulation is completed by the following conditions of:

i} using a Langevin equation representing variations of the accumulated damage quantity varying momently as a damage accumulation process model in the material of the apparatus based on Miner's law; and ii} using a Fokker-Planck equation rep resenting variations of a probability density function of the accumulated damage quantity varying momently.

3. The apparatus life estimating method under the narrow-band random stress amplitude variation according to claim 2, wherein a distribution width of the probability density function obtained from the Fokker-Planck equation is adjusted by a distribution dilatation ratio M.

4. A method for estimating a creep life of an apparatus under a narrow-band random stress amplitude variation and a narrow-band random temperature variation, including the steps of:

sampling and storing data on stress, strain, and temperature which occur in an apparatus during operation;

analyzing the stored data to determine a random stress amplitude variation σ(t) (instantaneous) being imposed on the material of the apparatus and a random temperature variation θ(t) (instantaneous);

determining a model expression of load variation by the following conditions of;

i) converting the random stress amplitude variation σ(t) (instantaneous) determined in the above step into a sum of a time average d value σ(t) (me an) and a stochastic variation σ'(t) which is a stress varying at the averaged value and thereabouts, and converting the random temperature variation θ(t) (instantaneous) determined in the above step into a sum of a time averaged value θ(t) (mean) and a stochastic variation θ'(t) which is a temperature varying at the averaged value and thereabouts, and ii) when the random stress amplitude variation σ(t) (instantaneous) and the random temperature variation θ(t) (instantaneous) determined in the above step are in a narrow band, approximating a damage coefficient indicative of a quantity of damage accumulated in the material of the apparatus per unit time by a linear expression which is a sum of a quantity of damage which the material undergoes from the stress at the time averaged value σ(t) (mean) and from the temperature at the time averaged value θ(t) and a quantity of damage which the material undergoes from the stress at the stochastic variation σ'(t) (mean) and from the temperature at the stochastic variation θ'(t);

determining a theoretical correction value of damage accumulation based on statistic characteristic data on a life of the material itself;

completing an estimating expression of damage accumulation by substituting thereinto the model expression of load variation and the theoretical correction value of damage accumulation; and calculating the life of the apparatus by the completed estimating expression of damage accumulation.

5. The apparatus life estimating method under the narrow-band random stress amplitude variation according to claim 4, wherein the estimating expression of damage accumulation is completed by the following conditions of:

i) using a Langevin equation representing variations of the accumulated damage quantity varying momently as a damage accumulation process model in the material of the apparatus based on Robinson's damage fraction rule; and ii) using a Fokker-Planck equation representing variations of a probability density function of the accumulated damage quantity varying momently.

* * * * *